(12) United States Patent
VanNahmen

(10) Patent No.: US 11,731,678 B2
(45) Date of Patent: Aug. 22, 2023

(54) PORTABLE AND MODULAR ROLLER DEVICE

(71) Applicant: Rollbedder, LLC, Highland Village, TX (US)

(72) Inventor: Alan G. VanNahmen, Manhattan, KS (US)

(73) Assignee: ROLLBEDDER, LLC, Highland Village, TX (US)

( * ) Notice: Subject to any disclaimer, the term of this patent is extended or adjusted under 35 U.S.C. 154(b) by 0 days.

(21) Appl. No.: 16/926,727

(22) Filed: Jul. 12, 2020

(65) Prior Publication Data

US 2021/0009179 A1     Jan. 14, 2021

Related U.S. Application Data

(60) Provisional application No. 62/873,577, filed on Jul. 12, 2019.

(51) Int. Cl.
*B62B 3/02*     (2006.01)
*B62B 3/04*     (2006.01)

(52) U.S. Cl.
CPC . *B62B 3/02* (2013.01); *B62B 3/04* (2013.01)

(58) Field of Classification Search
CPC ... B62B 3/02; B62B 2301/254; F16C 13/006; A63C 17/0006–0026; A63C 17/01; A63C 17/014; A63C 17/016; A63C 17/04–06; A63C 17/068
See application file for complete search history.

(56) References Cited

U.S. PATENT DOCUMENTS

| | | | | |
|---|---|---|---|---|
| 1,345,038 A | * | 6/1920 | Uppling | A63C 17/1454 280/11.233 |
| 4,150,838 A | * | 4/1979 | Lappage | A63C 17/24 280/843 |
| 4,445,699 A | * | 5/1984 | Darasko | B62K 21/005 280/266 |
| 4,666,169 A | * | 5/1987 | Hamill | A63C 17/061 280/11.233 |
| 4,681,333 A | * | 7/1987 | Rouge | A63C 17/006 280/810 |
| 4,768,793 A | * | 9/1988 | Spencer | A63C 5/035 280/11.233 |

(Continued)

*Primary Examiner* — Erez Gurari
(74) *Attorney, Agent, or Firm* — Husch Blackwell LLP

(57) ABSTRACT

A modular roller device to facilitate horizontal displacement of objects and materials, including large, heavy, or bulky objects and materials comprising a frame constructed of at least one formed rod, a first rolling member rotatably mounted to a first support arm, and a second rolling member rotatably mounted to a second support arm, wherein the first rolling member may be arranged in a generally parallel orientation relative to the second rolling member. The frame may comprise at least one extending section, and the opposing first and second support arms may be coupled thereto. The at least one extending section may comprise a longitudinally extending section and/or a diagonally extending section. The modular roller device may further comprise at least one secondary extending section. The modularly roller devices can be further combined to a form a system to facilitate the horizontal displacement of objects and materials.

6 Claims, 23 Drawing Sheets

(56) References Cited

U.S. PATENT DOCUMENTS

| | | | | |
|---|---|---|---|---|
| 5,277,437 A | * | 1/1994 | Moats | A63C 17/0086 280/11.233 |
| 5,342,070 A | * | 8/1994 | Miller | A43B 23/087 36/3 A |
| 5,551,717 A | * | 9/1996 | De Courcey Milne | A63C 17/013 280/87.041 |
| 6,089,580 A | * | 7/2000 | Borel | A63C 17/06 280/11.221 |
| 6,105,977 A | * | 8/2000 | Bengtsson | A63C 17/064 280/11.227 |
| 6,209,894 B1 | * | 4/2001 | Walker, IV | A63C 17/01 280/842 |
| 6,213,480 B1 | * | 4/2001 | Rodriguez | A63C 17/04 280/11.3 |
| 6,237,960 B1 | * | 5/2001 | Dornhofer | A63C 17/014 301/5.301 |
| 6,241,264 B1 | * | 6/2001 | Page | A63C 17/226 280/11.221 |
| 6,299,195 B1 | * | 10/2001 | Chan | B62B 3/02 280/DIG. 6 |
| 6,398,237 B1 | * | 6/2002 | Attey | A63C 17/16 188/29 |
| 6,592,129 B1 | * | 7/2003 | Gates | A63C 17/045 280/11.233 |
| 6,676,138 B1 | * | 1/2004 | Rosso | A63C 17/1427 280/11.221 |
| 6,832,765 B1 | * | 12/2004 | Walton | A63C 17/223 280/11.221 |
| D567,318 S | * | 4/2008 | Farrelly | A63C 17/06 D21/763 |
| 7,523,948 B1 | * | 4/2009 | Wright | A63C 17/004 280/11.221 |
| 7,537,426 B1 | * | 5/2009 | Dunn | E04D 15/003 414/495 |
| D892,244 S | * | 8/2020 | Basar | D21/765 |
| 2002/0063403 A1 | * | 5/2002 | Rudolph | A63C 17/06 280/11.221 |
| 2002/0185833 A1 | * | 12/2002 | Schuerman | B62B 13/18 280/47.34 |
| 2003/0122335 A1 | * | 7/2003 | Beck | A63C 17/016 280/87.041 |
| 2004/0004330 A1 | * | 1/2004 | Smyler | A63C 17/06 280/11.212 |
| 2004/0113415 A1 | * | 6/2004 | Jonsson | A63C 17/1454 280/842 |
| 2005/0040616 A1 | * | 2/2005 | Cheng | B62B 3/02 280/47.24 |
| 2006/0186617 A1 | * | 8/2006 | Farrelly | A63C 17/06 280/8 |
| 2008/0156599 A1 | * | 7/2008 | Keating | A63C 17/20 188/2 R |
| 2009/0107008 A1 | * | 4/2009 | Chou | A63C 17/08 36/103 |
| 2017/0056756 A1 | * | 3/2017 | Pikulski | A63C 17/016 |
| 2017/0129520 A1 | * | 5/2017 | Holloway | B62B 3/02 |
| 2019/0382072 A1 | * | 12/2019 | Allen | A63C 17/012 |
| 2020/0283049 A1 | * | 9/2020 | Mendoza | B62B 5/06 |
| 2021/0009179 A1 | * | 1/2021 | VanNahmen | F16C 13/006 |
| 2021/0339115 A1 | * | 11/2021 | Basar | A63C 17/011 |

* cited by examiner

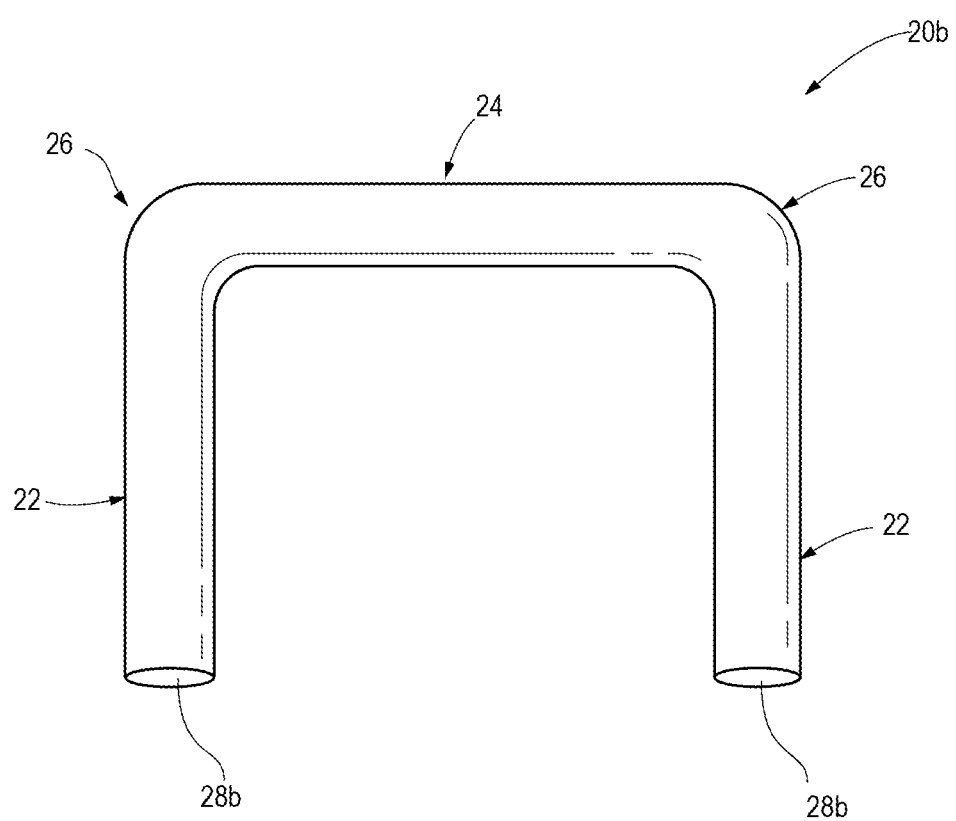

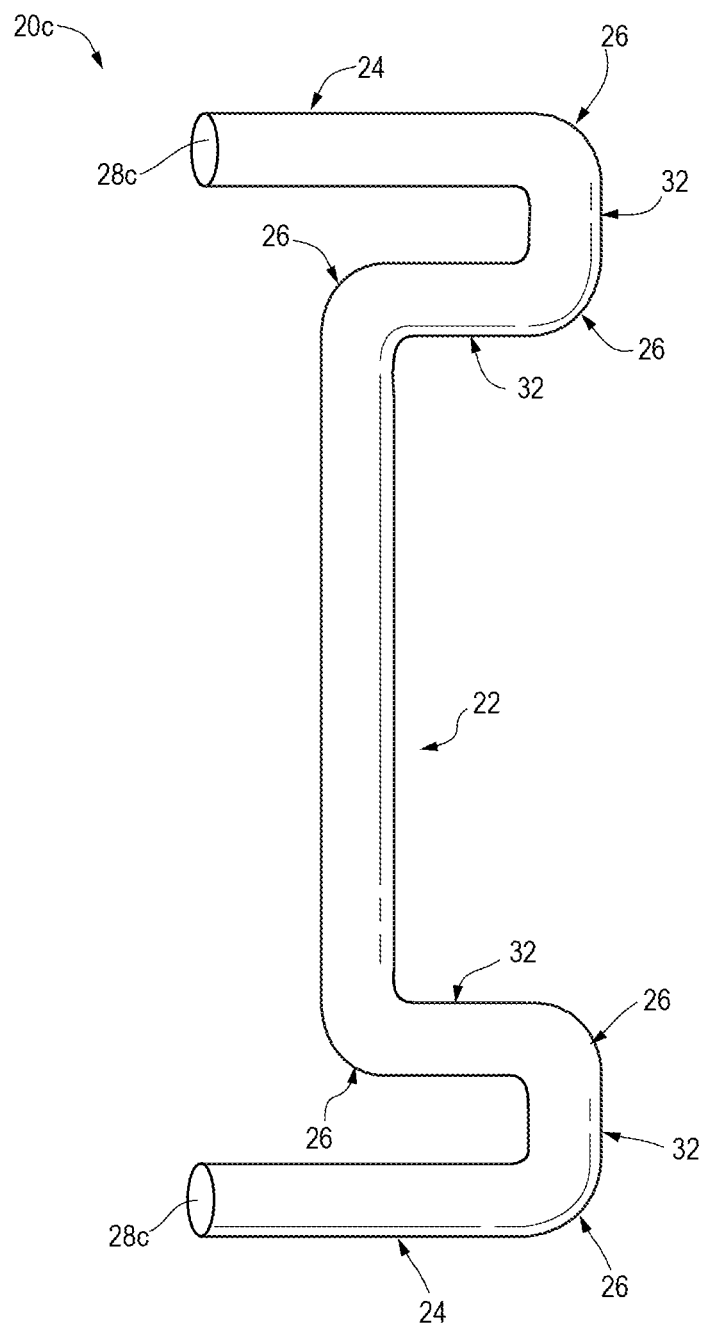

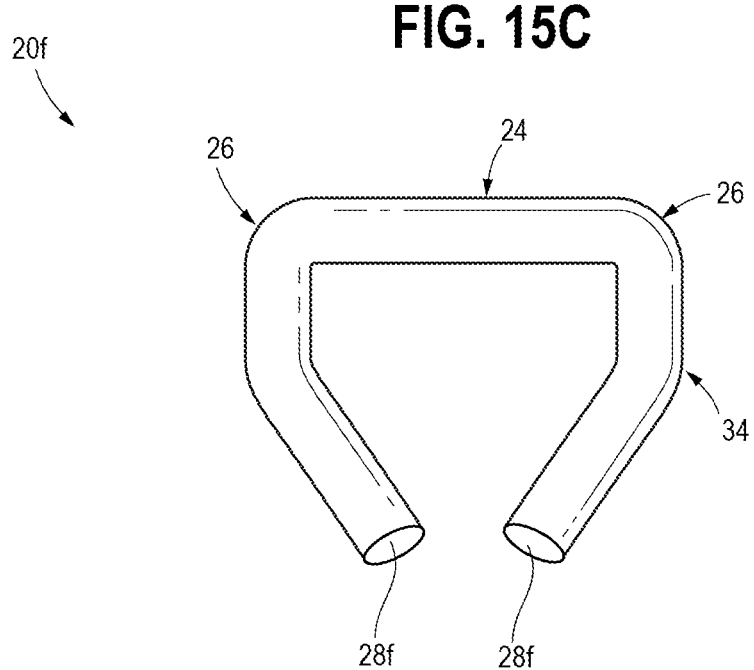

PORTABLE AND MODULAR ROLLER DEVICE

CROSS-REFERENCE TO RELATED APPLICATIONS

This application claims priority to U.S. Provisional Patent Application No. 62/873,577, filed Jul. 12, 2019, to Alan G. VanNahmen, entitled "Portable and Modular Roller System," the entire disclosure of which, including the specification and drawings, is incorporated herein by reference.

FIELD OF INVENTION

The present invention relates generally to cargo and material handling, and more particularly to a portable, modular, and self-contained roller device adapted to facilitate horizontal displacement of objects and materials, including large, heavy, or bulky objects and materials.

BACKGROUND OF INVENTION

There are a myriad of devices and apparatuses that are designed to facilitate the horizontal displacement of objects and materials, including bearings, rollers, conveyor systems, and rail-and-roller systems, among a variety of others. Typically, these devices are adapted for moving objects and materials in a generally horizontal and linear manner, and the applications of such devices vary widely. Such devices can be used in a variety of circumstances, including in warehouses and other industrial settings. On a small scale, such devices can be used for varying residential or commercial purposes, such as with drawers, doors, cabinetry, and the like or to move household objects, including furniture, appliances, and the like.

Currently known devices for moving objects and materials in a horizontal manner are not without deficiencies that make them complex, costly, difficult to implement, and/or limited to specific uses. One such problem relates to the fact that the implementation of such devices can require tedious planning and design to achieve a singular, limited, and/or application-specific purpose for an individual device. Further, the variety and amount of materials necessary to make, and the additional components necessary to implement or install, such devices—although varying among the different types of material handling devices presently known—only adds to the complexity and costs of the devices.

Another problem relates to the fact that, for many of these devices, the device must be secured or fastened. Generally, securing or fastening the device is necessary to stabilize it during use, or to ensure that the device remains stationary relative to a certain object, implement, or material to be moved or handled. This necessary act of securing or fastening the device affects its utility and versatility by limiting its potential and/or subsequent applications. Specifically, the object, implement, or material to be moved or handled must provide adequate foundation or space for attachment to which the device can be secured or fastened. Similarly, a device that is secured or fastened to the object, implement, or material to be moved or handled cannot be readily removed and/or used in another application.

Further, another problem relates to the size of the device, which has a proportional effect on the cost of the device. Generally, the size of an individual device often corresponds with the size and weight of the object or material to be horizontally displaced and the distance of such displacement. For example, in a rail-and-roller system commonly used for material handling in large factories and warehouses, although multiple fixed rollers can be arranged in line or in series to adequately distribute the weight of a heavy object to be horizontally displaced, multiple systems comprising fixed rollers in series must be arranged in parallel to adequately handle objects or materials of a larger size or unwieldly dimensions. In yet another example, for conveyor systems to effectively displace an object or materials, the length of the device must generally correspond with the distance that the objects or materials must travel—that is, longer distances of horizontal displacement require longer conveyor systems. Further yet, although such rail-and-roller systems may be suitable for handling different types of materials, they are not typically interchangeable to move objects of unplanned dimensions or under different materially handling circumstances. These examples further illustrate that a certain known material handling system may be well-suited for one application and ill-suited for another, alternative application.

Accordingly, a need exists for an improved material handling device for facilitating the horizontal displacement of objects and materials that is easy to implement, versatile, and not complex or costly.

SUMMARY OF THE INVENTION

One embodiment of the present invention is directed to a modular roller device, wherein the modular roller device may comprise a frame constructed of at least one formed rod, a first rolling member rotatably mounted to a first support arm, and a second rolling member rotatably mounted to a second support arm, wherein the rotational axis of the first rolling member may be arranged in a generally parallel orientation relative to the rotational axis of the second rolling member. The frame may comprise at least one extending section, and the opposing first and second support arms coupled to the at least one extending section.

Further, the modular roller device may further comprise at least one secondary extending section. In one embodiment, the at least one extending section may be a diagonally extending section. In another embodiment, the frame may comprise at least two extending sections. The modular roller device may comprise a fastening member coupling the at least two extending sections together. In one embodiment, the fastening member may be permanently affixed to the at least two extending sections. In another embodiment, the at least two extending sections may be positioned in a spaced relation to each other. In yet another embodiment, the first rolling member and second rolling member may each include an upper portion adapted for being rollingly engaged by an object located above the modular roller device and a lower portion adapted for rollingly engaging a base surface located below the modular roller device.

Another embodiment of the present invention is directed to a modular roller device, wherein the modular roller device may comprise a first frame half constructed of a first formed rod, a second frame half constructed of a second formed rod, a first rolling member rotatably mounted to a first support arm, a second rolling member rotatably mounted to a second support arm, and a fastening member coupling the first frame half and second frame half together, wherein the first rolling member may be arranged in a generally parallel orientation relative to the second rolling member. The first frame half may comprise a first extending section and the first support arm projecting from the first extending section.

The second frame half may comprise a second extending section and the second support arm projecting from the second extending section.

Further, the modular roller device may further comprise at least one secondary extending section. In another embodiment, at least one of the first extending section and the second extending section may be a diagonally extending section. In yet another embodiment, the fastening member may be permanently affixed to the first extending section and the second extending section. In a further embodiment, the first frame half and second frame half may be positioned in a spaced relation by the fastening member. The first rolling member may comprise a plurality of rolling member segments.

Yet another embodiment of the present invention is directed to a system, wherein the system may comprise a first modular roller device comprising a first frame and a second modular roller device comprising a second frame, wherein the first modular roller device and the second modular roller device may be arranged in a spaced relationship. The first frame may comprise at least one first extending section, at least one first support arm projecting from the at least one first extending section, and at least two generally parallel first rolling members coupled to the first frame. The second frame may comprise at least one second extending section, at least one second support arm projecting from the at least one second extending section, and at least two generally parallel second rolling members coupled to the second frame. Further, the first modular roller device and the second modular roller device may be arranged in an inline spaced relationship. Further yet, the first modular roller device may be operable coupled to the second modular roller device. Even further yet, at least one of the first modular roller device and the second modular roller device may comprise a fastening member.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views:

FIG. 7C is a top view of frame half of a roller device in accordance with a further embodiment of the present invention;

FIG. 8B is a top view of frame half of a roller device in accordance with another embodiment of the present invention;

FIG. 15C is a top view of frame half of a roller device in accordance with a further embodiment of the present invention;

DETAILED DESCRIPTION OF THE INVENTION

Figure 1:
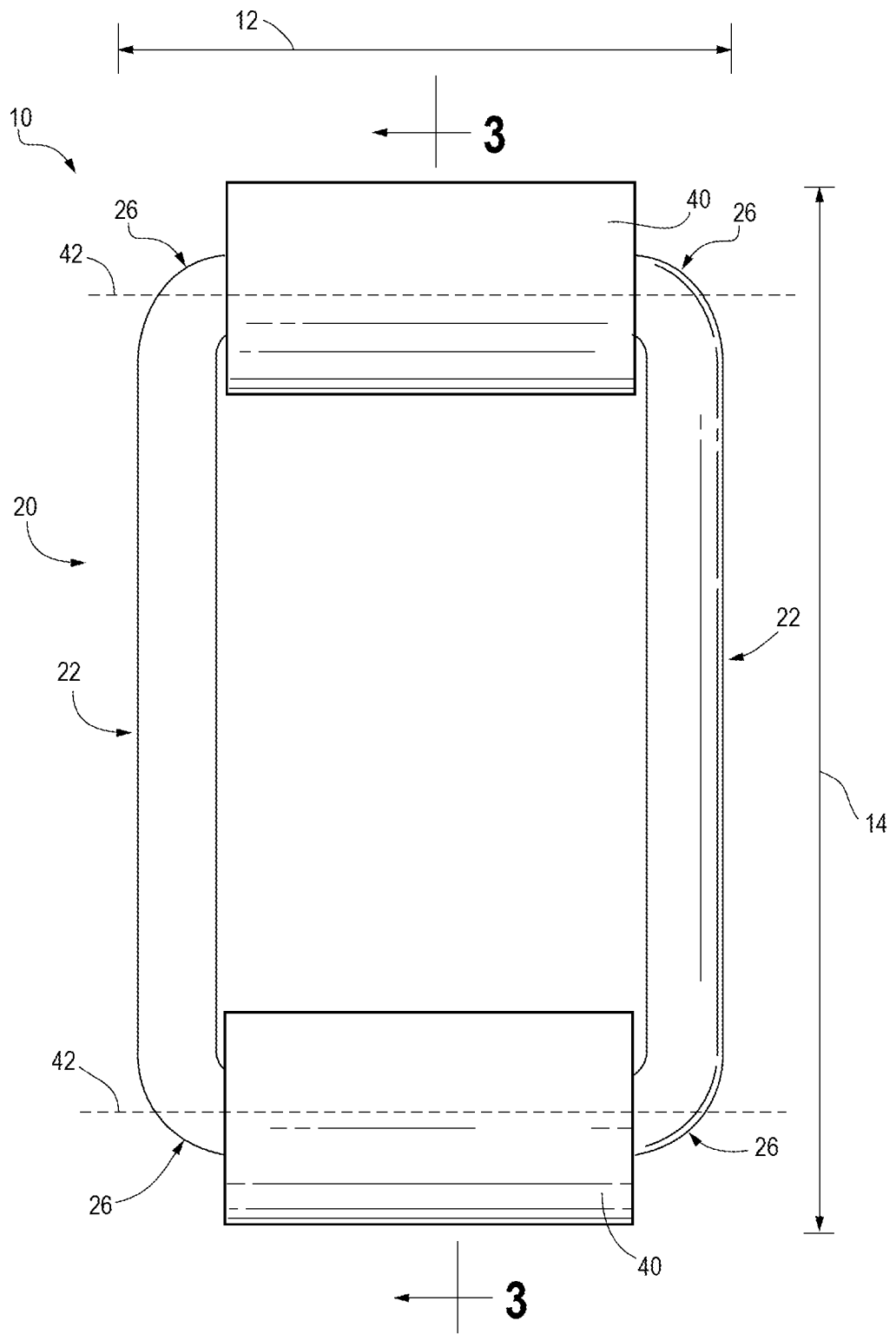
FIG. 1 is a top view of a roller device with a frame and two rolling members in accordance with one embodiment of the present invention.

Various embodiments of the present invention are described and shown in the accompanying materials, descriptions, instructions, and drawings. For purposes of clarity in illustrating the characteristics of the present invention, proportional relationships of the elements have not necessarily been maintained in the drawings. It will be appreciated that any dimensions included in the drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One objective of the present invention is to provide a device to facilitate the horizontal displacement of objects and materials, including large, heavy, or bulky objects and materials. Another objective of the present invention is to provide a versatile, universal, and reusable device to facilitate the horizontal displacement of various objects and materials. A preferred embodiment of the present invention is designed to provide (a) a portable material handling device that is versatile and capable of being easily and reusably implemented in a variety of circumstances, (b) a modular material handling device that is capable of being assembled or grouped with other such devices, in varying numbers and combinations, to accommodate objects and materials of varying sizes, weights, and shapes, and (c) a self-contained material handling device that is of simple and inexpensive construction.

FIG. 1 depicts a top view of a roller device 10 in accordance with one embodiment of the present invention. The roller device 10 may define a width 12, a length 14, and a height 16 (see FIG. 3) and may generally comprise a frame 20 and at least two rolling members 40. In one embodiment, the frame 20 can generally comprise longitudinally extending sections 22, support arms 24 (described below), and transition or bend sections 26. Each rolling member 40 can generally comprise an axis 42 and an inner axial hole 44 (see FIG. 3). It will be appreciated that the roller device 10 may define several general shapes, including a frame 20 constructed in various shapes and constructed of one or multiple pieces, and less than or more than two rolling members 40.

Figure 2:
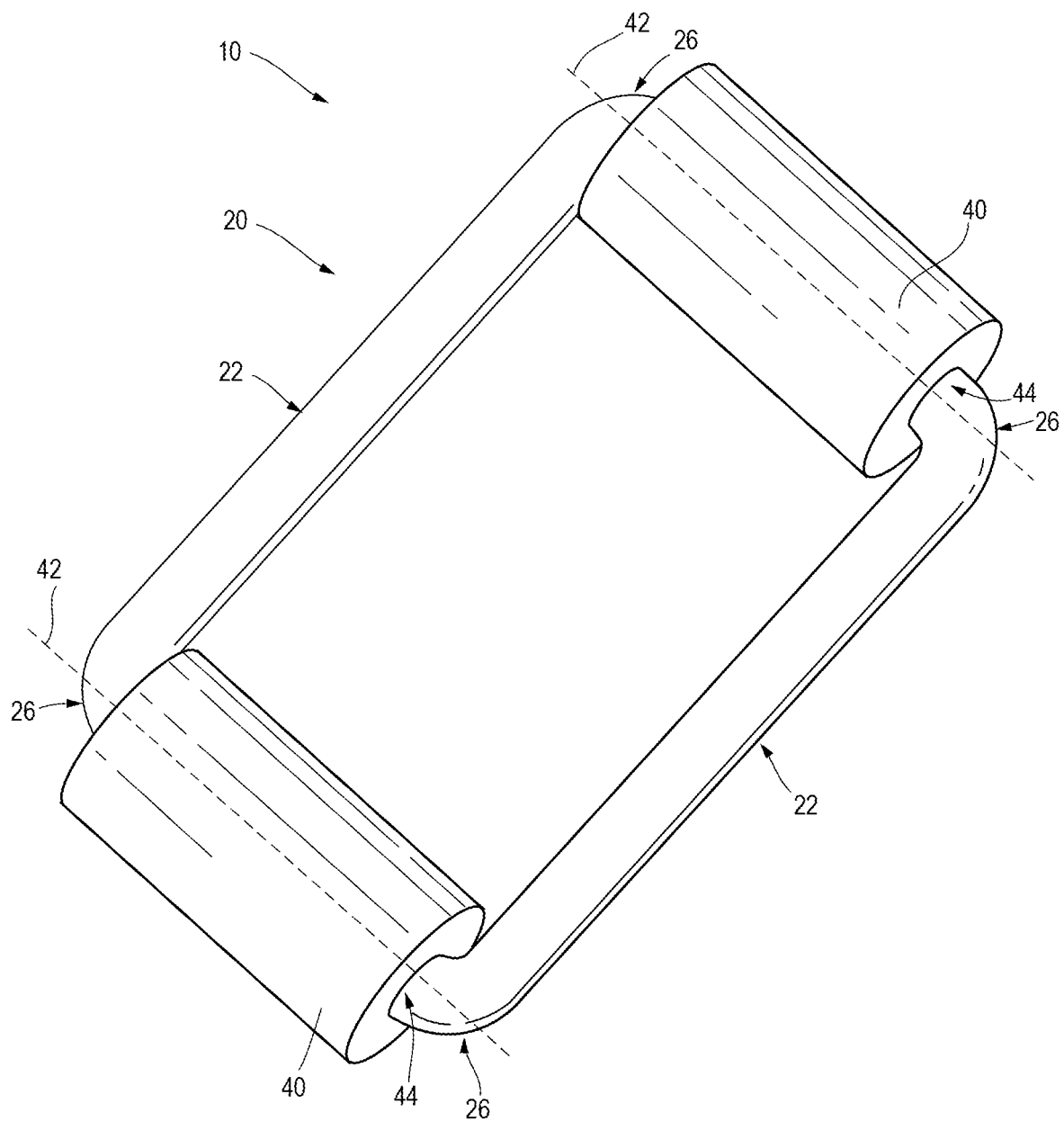
FIG. 2 is a perspective view of the roller device of FIG. 1.

In one embodiment, as best shown in FIGS. 1 and 2, the frame 20 may define a generally rectangular shape. The frame 20 may include generally parallel longitudinally extending sections 22, first and second generally parallel and opposing support arms 24, and bend sections 26 (which may be of any desired radius). The longitudinally extending sections 22 may be arranged in generally parallel relation and in a general shared plane. The support arms 24 may be arranged in generally parallel relation and in a general shared plane, which may include the same general shared plane as the longitudinally extending sections 22. In one embodiment, the support arms 24 may project from the longitudinally extending sections 22. In another embodiment, support arms 24 may project from the longitudinally extending section 22 at approximate right angles. It will be appreciated that the longitudinally extending sections 22 may vary in length and be of different lengths from each other, and the support arms 24 may vary in length and be of different lengths from each other.

The longitudinally extending sections 22 and the support arms 24 may be separated by the bend sections 26 at the intersecting corners. However, it will be understood that the support arms 24 may project from the longitudinally extending sections 22 from locations other than the ends or termini of the longitudinally extending sections 22, or the corners of the frame 20, including, without limitation, at any point along the lengths of the longitudinally extending sections 22. In such embodiments, the longitudinally extending sections 22 and the support arms 24 may or may not be separated by bend sections 26.

It will be appreciated that the longitudinally extending sections 22 can be arranged in varying spaced relation, such that the width 12 of the roller device 10 can vary as well. The roller device 10 may be of any suitable width 12 depending upon its desired application. In one embodiment, the roller device 10 has a certain width 12 such that roller device 10 may be used with a pickup bed, namely, placed in a channel or groove 74 (see FIG. 18) defined between two parallel ridges as is common in pickup truck bed floors. In that regard, the width 12 of the roller device 10 may be between about 1 inch (about 2.54 centimeters) and about 2 inches (about 5.08 centimeters) in one embodiment, and about 1.5 inches (about 3.81 centimeters) in a further embodiment, thereby allowing it to be received and roll within the channel of a pickup truck bed floor.

The rolling members 40 may be generally cylindrical in shape. As illustrated in FIG. 1, the rolling members 40, and the rotational axes thereof, may be arranged in a generally parallel orientation relative to each other. Such parallel arrangement of the rolling members 40 can allow for the pair of rolling members 40 to simultaneously contact a generally flat surface (not shown), which allows the roller device 10 to be generally parallel to the contacted surface and free to traverse the contacted surface when the rolling members 40 are rotated about their axes 42. In one embodiment, the rolling members 40 may be arranged in the same general shared plane as the longitudinally extending sections 22. However, it will be appreciated that the rolling members 40 may be arranged in a different general plane than the longitudinally extending sections 22.

In one embodiment, the rolling members 40 may consist of an impregnated material or a hard plastic, such as polyethylene, polyurethane, polypropoylene, or polyoxymethylene; however, it will be appreciated that the rolling members 40 may be composed of other suitable materials, including any known composite materials or combination of hard plastics, as well as steel, hard wood, aluminum, brass, and so on. The rolling members 40 and/or components thereof, may be formed using any suitable manufacturing processes, such as injection molding, compression molding, rotational molding, other suitable molding processes, 3D printing, pressing, stamping, forging, milling, lathing, and any other suitable manufacturing process.

Figure 3:
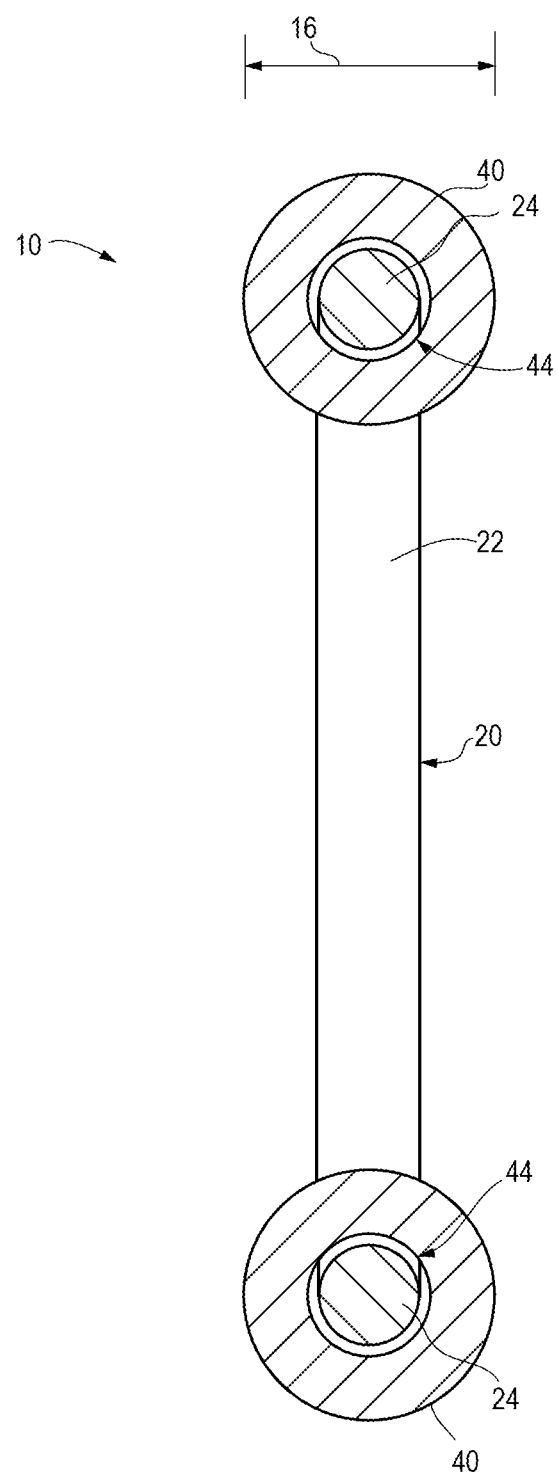
FIG. 3 is a cross-sectional side view of the roller device of FIG. 1 taken generally along line 3-3.

FIG. 3 depicts a cross-sectional side view of the roller device 10, wherein the cross sections of the support arms 24 of the frame 20 and the rolling members 40 are depicted. As best shown in FIG. 3, the support arm 24 of the frame 20 can be situated within the inner axial hole 44 of the rolling member 40. In one embodiment, the support arm 24 can support the rolling member 40 while also allowing the rolling member 40 to rotate freely about its axis 42. It will be appreciated that due to this arrangement, the rolling member 40 may be placed directly around and rotate about the support arm 24 of the frame 20. In alternative embodiments, a bearing, sleeve, or bushing may be placed between the rolling member 40 and the support arm 24.

As illustrated in FIG. 3, the arrangement of the rolling member 40 with respect to the frame 20 creates a low vertical profile or height 16 for the roller device 10. In one embodiment, the roller device 10 has a height 16 such that roller device 10 may be used with a pickup bed, namely, placed in a channel or groove 74 defined between two parallel ridges as is common in pickup truck bed floors. In that regard, the height 16 of the roller device 10 may be between about ¼ inch (about 0.635 centimeter) and about 2 inches (about 5.08 centimeters) in one embodiment, between about ⅜ inch (about 0.9525 centimeter) and about 1 inch (about 2.54 centimeters) in another embodiment, and is about ½ inch (about 1.27 centimeters) in a further embodiment, thereby allowing it to protrude above the ridges of a pickup truck bed when received within the channel of a pickup truck bed floor.

It will be appreciated that because the widths and depths of the channels or grooves in various OEM pickup truck bed floors may vary from manufacture to manufacture (e.g., Dodge®, Chevrolet®, Ford®, Toyota®, and so on.) and/or model to model, certain embodiments of the roller device 10 may be sized and configured for a particular make and model. For example, the width and diameter of the rolling members 40 may be suitable for being received within such channels or grooves of a specific make and model.

Conversely, other embodiments may be designed to be "universal" or OEM-agnostic. For example, in such embodiments, the width of the rolling members 40 relative to the width of the support arms 24 may be such that the rolling members 40 can "float" from side to side on the support arms 24. In another embodiment (not shown), a rolling member 40 may actually comprise a plurality of rolling member segments, the number of which may be optionally varied. In other words, the roller device 10 may be configured such that its width may be increased or decreased simply by the user adding or removing rolling member segments (e.g., adding or removing one or more of a plurality of ¼-inch (0.635 centimeter) segments, ⅜-inch (0.9525 centimeter) segments, ½-inch (1.27 centimeters) segments, and so on of the rolling member 40). Such an embodiment permits a single roller device 10 to have the versatility for use in a variety of applications.

It will be appreciated that the roller device 10 may comprise a combination of frame 20 and any number of rolling members 40 configurations. For example, the roller device 10 may include three, four, five, or more inline rolling members 40. Such multiple rolling members 40 may be arranged in an inline "ladder" configuration. In one non-limiting embodiment, for example, four rolling members 40 may be arranged in an inline configuration on 4-inch (10.16 centimeters) center-center spacings, thus creating an assembly having an overall length of about 12 inches (about 30.48 centimeters), for example. In such embodiments, the roller devices 10 can be operably coupled together to form a train of roller devices 10, including through linkage members, tension members, fastening members, and the like, whether presently known or later developed. It will also be appreciated that the roller device 10 may include multiple rolling members 40 in a side-by-side configuration. It will be further understood that roller device 10 may have rolling members 40 arranged in a grid configuration, for example a 2×2 grid or a 4×4 grid of rolling members 40, although grids of other sizes and arrangements of are also within the scope of the present invention.

Figure 4A:
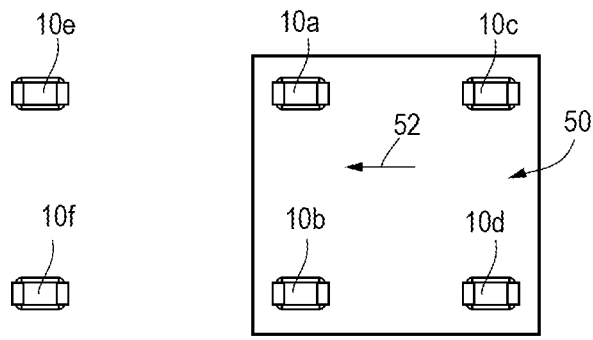
FIG. 4A is a top schematic diagram illustrating multiple roller devices used in moving an object and showing the object in a first position in accordance with a further embodiment of the present invention.
Figure 4B:
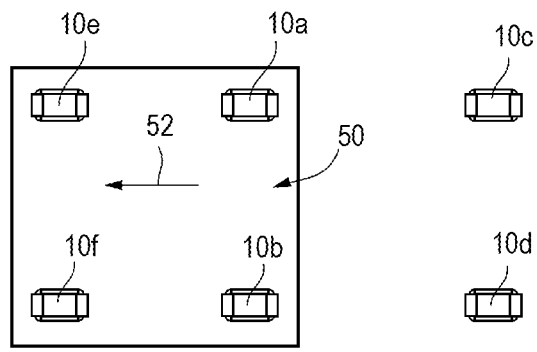
FIG. 4B is a top schematic diagram illustrating multiple roller devices used in moving an object and showing the object in a second position in accordance with a further embodiment of the present invention.
Figure 4C:
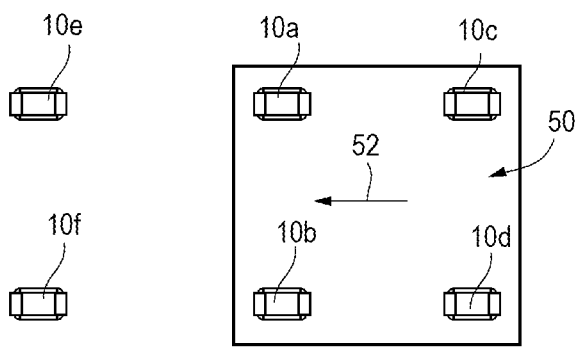
FIG. 4C is a top schematic diagram illustrating multiple roller devices used in moving an object and showing the object in a second position in accordance with a further embodiment of the present invention.

FIGS. 4A-4C illustrate multiple roller devices 10a-10f used in moving an object 50, such as a box, platform, frame, sheet of plywood, laminated board or panel, or the like. In one embodiment, the object 50 may be a sheet or panel suitable for placement in a pickup truck bed, onto which cargo may be placed so that it can be rolled in and out of the pickup truck bed, for purposes of transport, storage, and easy access. It will be appreciated that one or multiple roller devices 10a-10f may be used independently or in combination with each other. For example, in moving a large object 50, it will be understood that a roller device 10a, 10b, 10c, and 10d may be placed under each corner of the object 50. Additional roller devices 10e and 10f may also be placed ahead of the object 50 (as demonstrated in FIG. 4A) so that, as the box advances direction of the arrow 52 from a first position (as shown in FIG. 4A) to a second position (as shown in FIG. 4B), the front end of the object 50 will advance over the top of and engage the additional roller devices 10e and 10f (as demonstrated in FIG. 4B). To that end, as the object 50 advances, the roller devices 10c and 10d proximate the rear end of the object 50 will become exposed as the object 50 passes over them, as depicted in FIG. 4B. Those roller devices 10c and 10d may then be picked up and placed ahead of the object 50 (as shown in FIG. 4C) so that the front end of the object 50 will advance over the top of and engage the roller devices 10c and 10d as the object 50 advances in the direction of the arrow 52. It will be understood that other configurations and quantities of roller devices 10 may selectively be employed in moving objects of various sizes, shapes, and weights.

Figure 5:
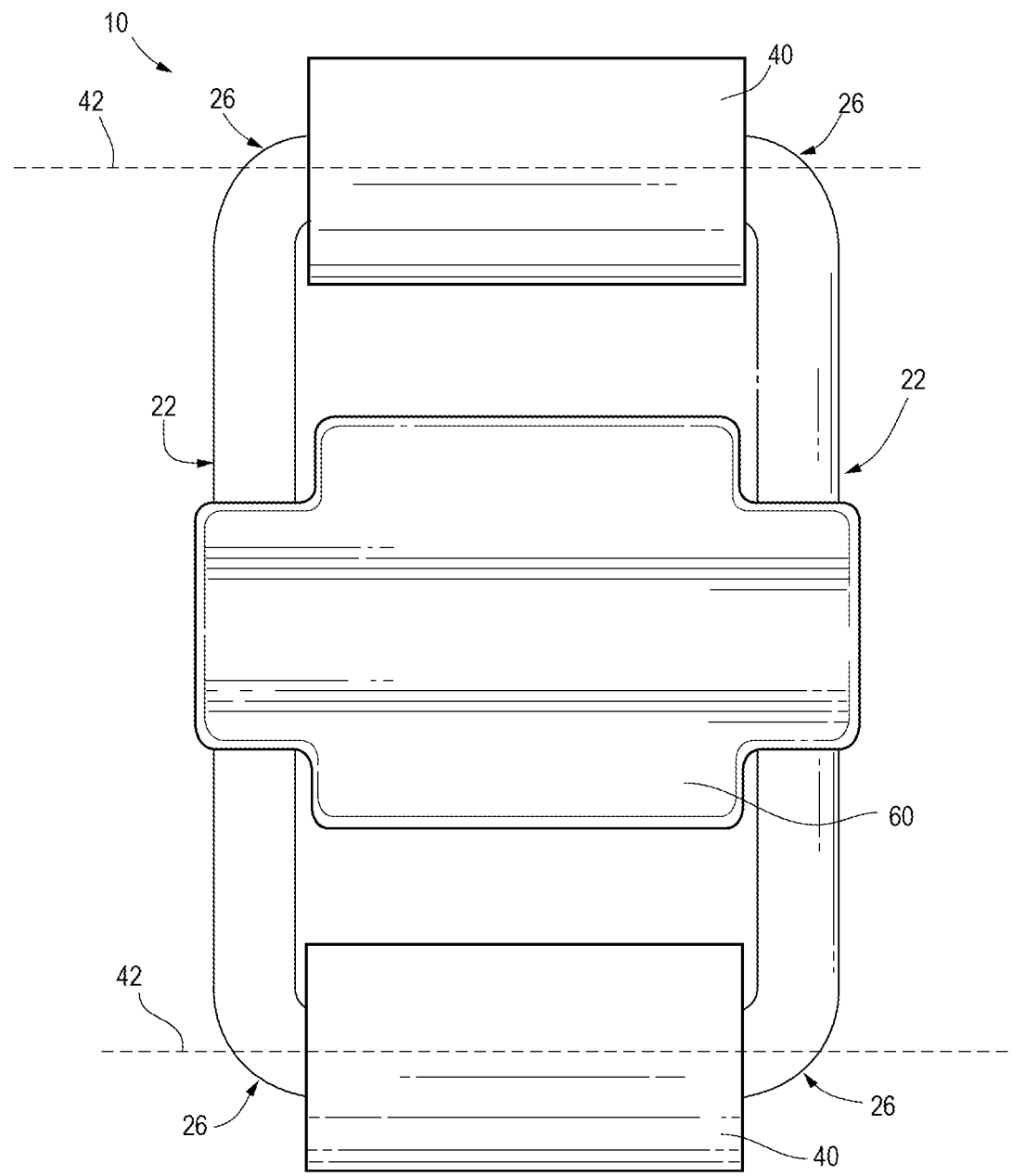
FIG. 5 is a top view of a roller device with a frame, two rolling members, and a fastening member in accordance with another embodiment of the present invention.
Figure 6:
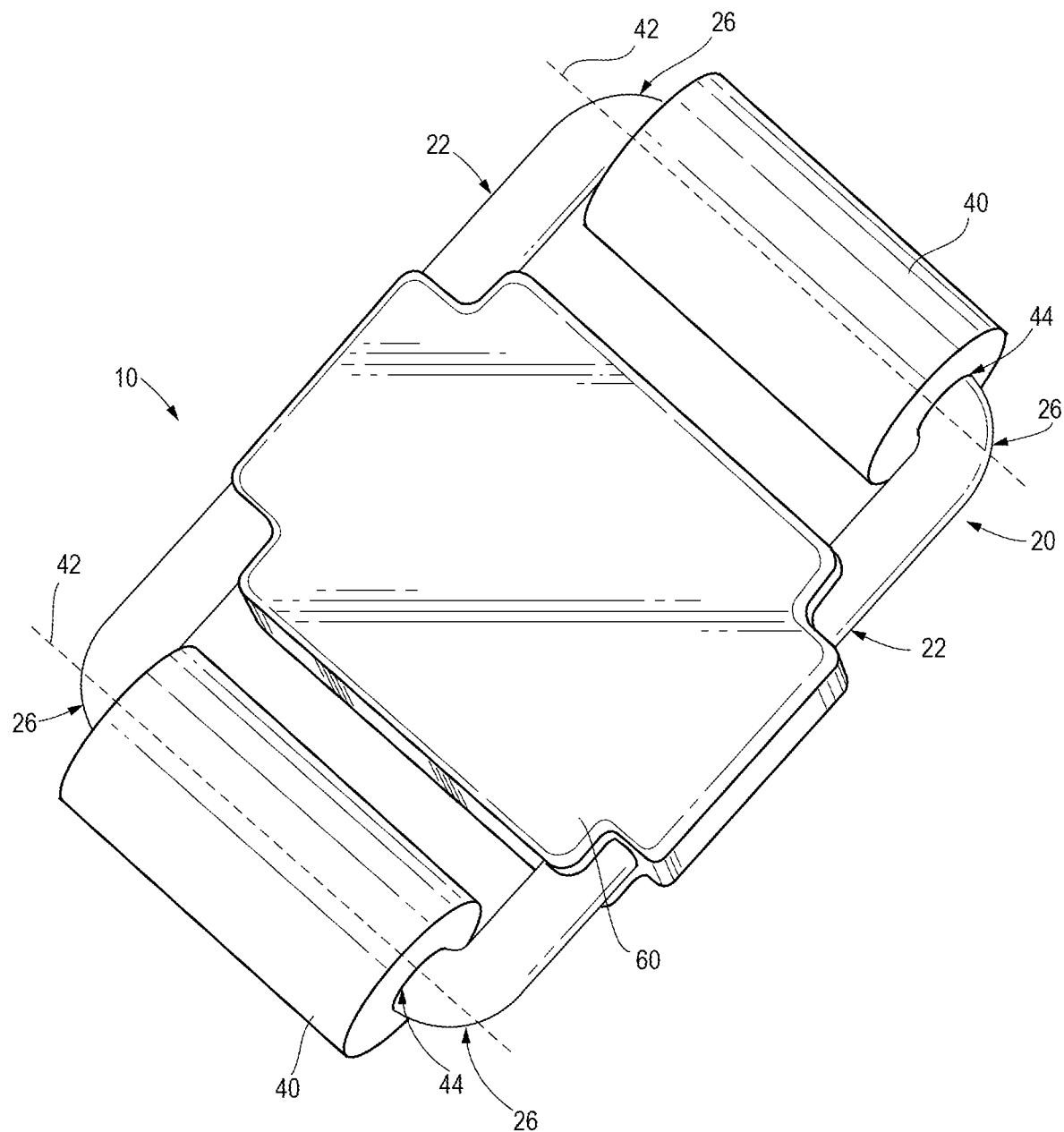
FIG. 6 is a perspective view of the roller device of FIG. 5.

In another embodiment, as best illustrated in FIGS. 5 and 6, the roller device 10 may further comprise a fastening member 60. The fastening member 60 can be adapted to attach to the frame 20, for example to maintain frame halves 20a-20f (when present) in an assembled relationship. In one embodiment, the fastening member 60 may consist of a glass-filled polymer (such as polyamide or nylon, acetal homopolymers and copolymers, polyester, polyphenylene oxide, polycarbonate, or polyethersulphone), a hard plastic (such as polyurethane, polyethylene, polypropoylene, or polyoxymethylene), metallic materials (such as aluminum, steel, or alloys), any other suitable material, or any combination thereof. It will also be appreciated that the fastening member 60 may be composed of other suitable materials, including any known composite materials or combinations of hard plastics and the like, as well as steel, hard wood, aluminum, brass, and so on. The fastening member 60 and/or components thereof, may be formed using any suitable manufacturing processes, such as injection molding, compression molding, rotational molding, other suitable molding processes, 3D printing, pressing, stamping, forging, milling, and any other suitable manufacturing process.

In one embodiment, the fastening member 60 may be removably attached or coupled to the frame 20, for example with a snap-fit closure system or the like. In that regard, the fastening member 60 may be made of two separate pieces (not shown) that snap together. However, it will be appreciated that the fastening member 60 may be permanently attached or coupled to the frame 20 and/or the halves 20a-20f thereof, for example via the structure and shape of the fastening member 60, welding, adhesives, fasteners, or other fastening means. In one embodiment, the fastening member 60 may be permanently attached or coupled to the frame 20 through insert molding, wherein the frame 20, or any parts or portions thereof, can be provided in a mold as the fastening member 60 is formed and molded into its desired shape around the same. In another embodiment, the fastening member 60 may be permanently attached or coupled to the frame 20 through over-molding, wherein the frame 20, or any parts or portions thereof, can be provided in a mold as the fastening member 60 is formed and molded into its desired shape over or on one side of the same.

Figure 7A:
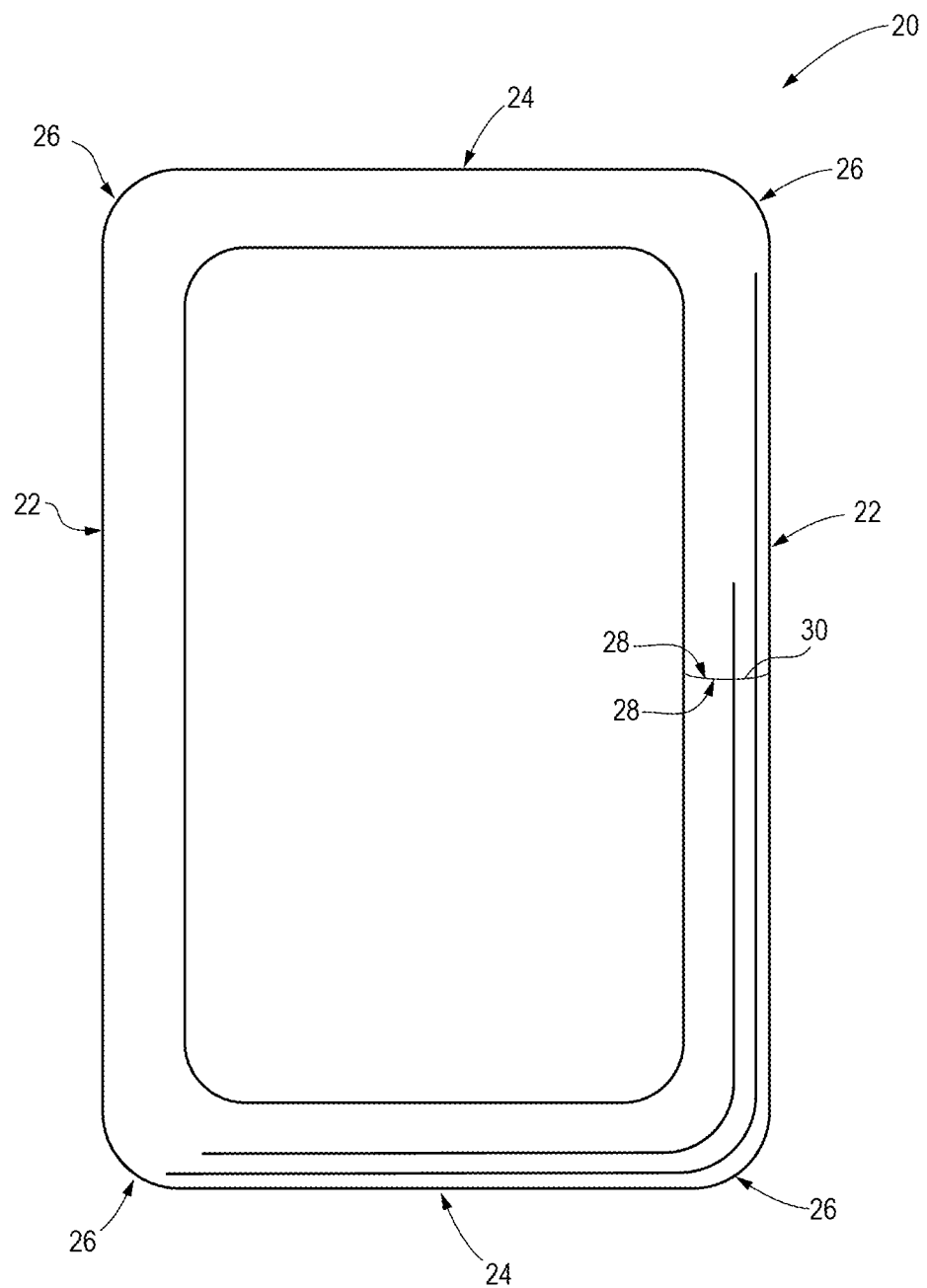
FIG. 7A is a top view of a frame of a roller device in accordance with one embodiment of the present invention.

It will be appreciated that the frame 20 may be constructed from a single piece of material or from multiple pieces of material that are affixed, fastened, or otherwise coupled together. FIG. 7A illustrates one embodiment of the frame 20 that is constructed from a single piece of material and is bent, formed, molded, or otherwise developed into a desired shape. For purposes of clarity, the rolling members 40 are not shown. The frame 20 may include generally parallel longitudinally extending sections 22, first and second generally parallel and opposing support arms 24, and bend sections 26 at its corners (which may be of any desired radius). In this embodiment, a straight piece of round rod may be bent into shape such that it forms an enclosed generally rectangular (or other suitable shape) loop wherein the distal ends 28 of the rod are brought together at a joint 30. While the joint 30 is shown as being located along a longitudinally extending section 22, it will be understood that the joint 30 may be positioned in other locations, such as along a support arm 24 section, at a corner, along a bend section 26, or elsewhere.

Figure 7B:
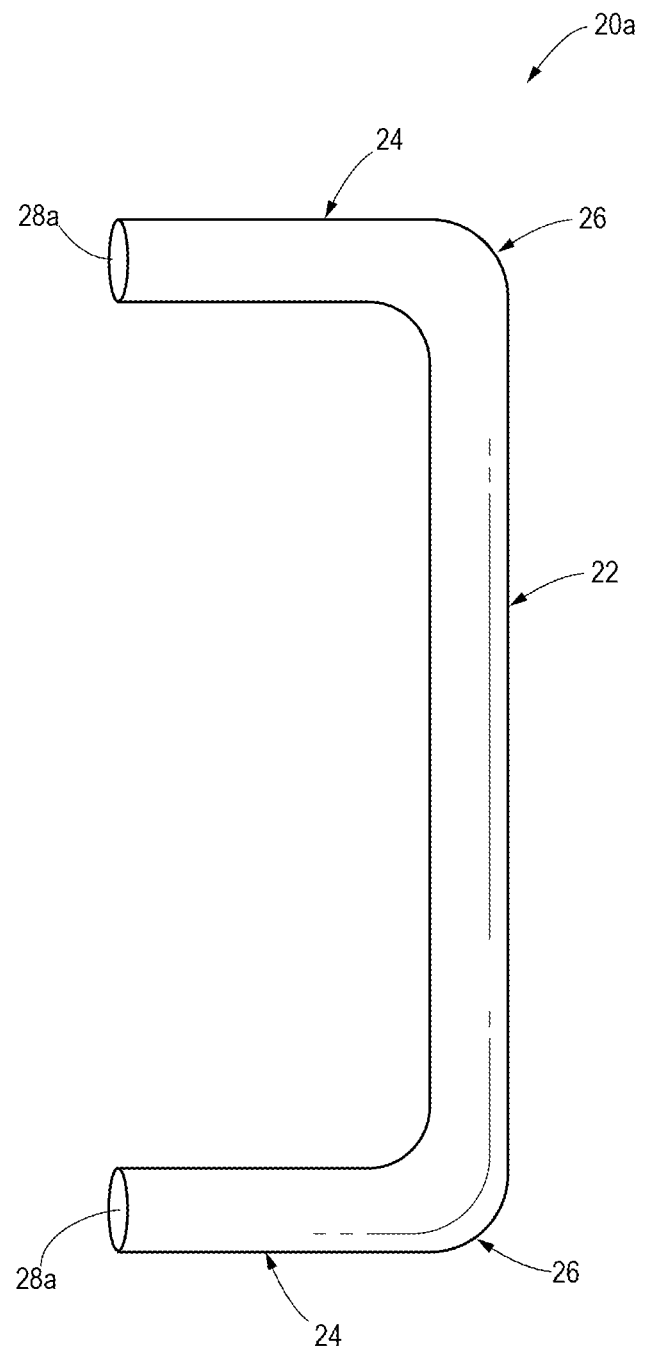
FIG. 7B is a top view of frame half of a roller device in accordance with another embodiment of the present invention.

FIG. 7B depicts one frame half 20*a* in accordance with another embodiment. In this embodiment, two of the halves 20*a* are affixed, fastened, or otherwise coupled together to form the full frame 20. Each frame half 20*a* may be generally C-shaped, wherein the support arms 24 are parallel and project from the longitudinally extending section 22 in the same relative direction and at approximate right angles from the longitudinally extending section 22. FIG. 7B depicts the support arms 24 as approximately equal lengths; however, it will be appreciated that the support arms 24 may vary in length and be of different lengths. The distal end 28*a* of support arms 24 of separate frame halves 20*a* can be affixed, attached, or otherwise coupled together inside the inner axial hole 44 of the rolling member 40 to maintain the overall shape of the roller device 10. These attachment or coupling means can be any number of fastening means, including by welding, interlocking elements, and the like. In another embodiment, the frame halves 20*a* may be held together by a strap or fastening member 60 (see FIGS. 4 and 5). It will be appreciated that the support arms 24 of corresponding frame halves 20*a* can be aligned (such that they may be received within an inner axial hole 44 of a rolling member 40), yet have a gap therebetween.

FIG. 7C depicts one frame half 20*b* in accordance with a further embodiment. In this embodiment, two of the halves 20*b* are affixed, fastened, or otherwise coupled together to form the full frame 20. Each frame half 20*b* may be generally U-shaped, wherein the longitudinally extending sections 22 are parallel and project from the support arm 24 in the same relative direction and at approximate right angles from the support arm 24. FIG. 7C depicts the longitudinally extending sections 22 as approximately equal lengths; however, it will be appreciated that the longitudinally extending sections 22 may vary in length and be of different lengths. The distal end 28*b* of longitudinally extending sections 22 of separate frame halves 20*b* can be affixed, attached, or otherwise coupled together to maintain the overall shape of the roller device 10. These attachment or coupling means can be any number of fastening means, including by welding, interlocking elements, and the like. In another embodiment, as the frame halves 20*a* may be held together by a strap or fastening member 60 (see FIGS. 4 and 5).

In one embodiment, the halves 20*a* or 20*b* of the frame 20 are coupled by the fastening member 60. When halves 20*a* of the frame 20 are coupled by the fastening member 60, the distal ends 28*a* of the support arms 24 of the two frame halves 20*a* may align in a generally axial manner. Further, the support arms 24 of the frame halves 20*a* may be positioned in a spaced relation; however, it will be appreciated that, in other embodiments, the distal ends 28*a* of the frame halves 20*a* may be arranged so that they are touching or fastened together. Similarly, when halves 20*b* of the frame 20 are coupled by the fastening member 60, the distal ends 28*b* of longitudinally extending sections 22 of the two frame halves 20*b* may align in a generally axial manner. Further, the longitudinally extending sections 22 of the frame halves 20*b* may be positioned in a spaced relation; however, it will be appreciated that, in other embodiments, the distal ends 28*b* of the frame halves 20*b* may be arranged so that they are touching or fastened together.

In other embodiments, as best shown in FIGS. 8-13, the frame 20 may define an enclosed generally I-shaped configuration. The frame 20 may include generally parallel longitudinally extending sections 22, first and second generally parallel and opposing support arms 24, bend sections 26 (which may be of any desired radius), and a plurality of secondary extending sections 32. The longitudinally extending sections 22 may be arranged in generally parallel relation and in a general shared plane. The support arms 24 may be arranged in generally parallel relation and in a general shared plane, which may include the same general shared plane as the longitudinally extending sections 22. The secondary extending sections 32 may be arranged in a general shared plane, which may include the same general shared plane as the longitudinally extending sections 22 and/or the support arms 24.

The secondary extending sections 32 may be arranged in a variety of orientations relative to each other and the other components comprising the frame 20. In one embodiment, at least some of the secondary extending sections 32 may be arranged in a generally parallel relation to the longitudinally extending sections 22 and each other, and in a generally perpendicular relation to the support arms 24 and other secondary extending sections 32. In another embodiment, at least some of the secondary extending sections 32 may be arranged in a generally parallel relation to the support arms 24 and each other, and in a generally perpendicular relation to the longitudinally extending sections 22 and other secondary extending sections 32. It will be appreciated that the secondary extending sections 32 may be arranged in any non-parallel or non-perpendicular relation to the longitudinally extending sections 22, the support arms 24, and each other.

In one embodiment, the secondary extending sections 32 may project from the longitudinally extending sections 22. In another embodiment, the secondary extending sections 32 may project from the longitudinally extending section 22 at approximate right angles. It will be appreciated that the longitudinally extending sections 22 may vary in length and be of different lengths from each other, and the secondary extending sections 32 may vary in length and be of different lengths from each other.

The longitudinally extending sections 22 and the secondary extending sections 32 may be separated by the bend sections 26 at the intersecting corners. However, it will be understood that the secondary extending sections 32 may project from the longitudinally extending sections 22 from locations other than the ends or termini of the longitudinally extending sections 22, including, without limitation, at any point along the lengths of the longitudinally extending sections 22. In such embodiments, the longitudinally extending sections 22 and the secondary extending sections 32 may or may not be separated by bend sections 26.

In another embodiment, the support arms 24 may project from the secondary extending sections 32. In another embodiment, the support arms 24 may project from the secondary extending sections 32 at approximate right angles. It will be appreciated that the support arms 24 may vary in length and be of different lengths from each other.

The support arms 24 and the secondary extending sections 32 may be separated by the bend sections 26 at the intersecting corners. However, it will be understood that the support arms 24 may project from the secondary extending sections 32 from locations other than the ends or termini of the secondary extending sections 32, or the corners of the frame 20, including, without limitation, at any point along the lengths of the secondary extending sections 32. In such embodiments, the support arms 24 and the secondary extending sections 32 may or may not be separated by bend sections 26.

Figure 8A:
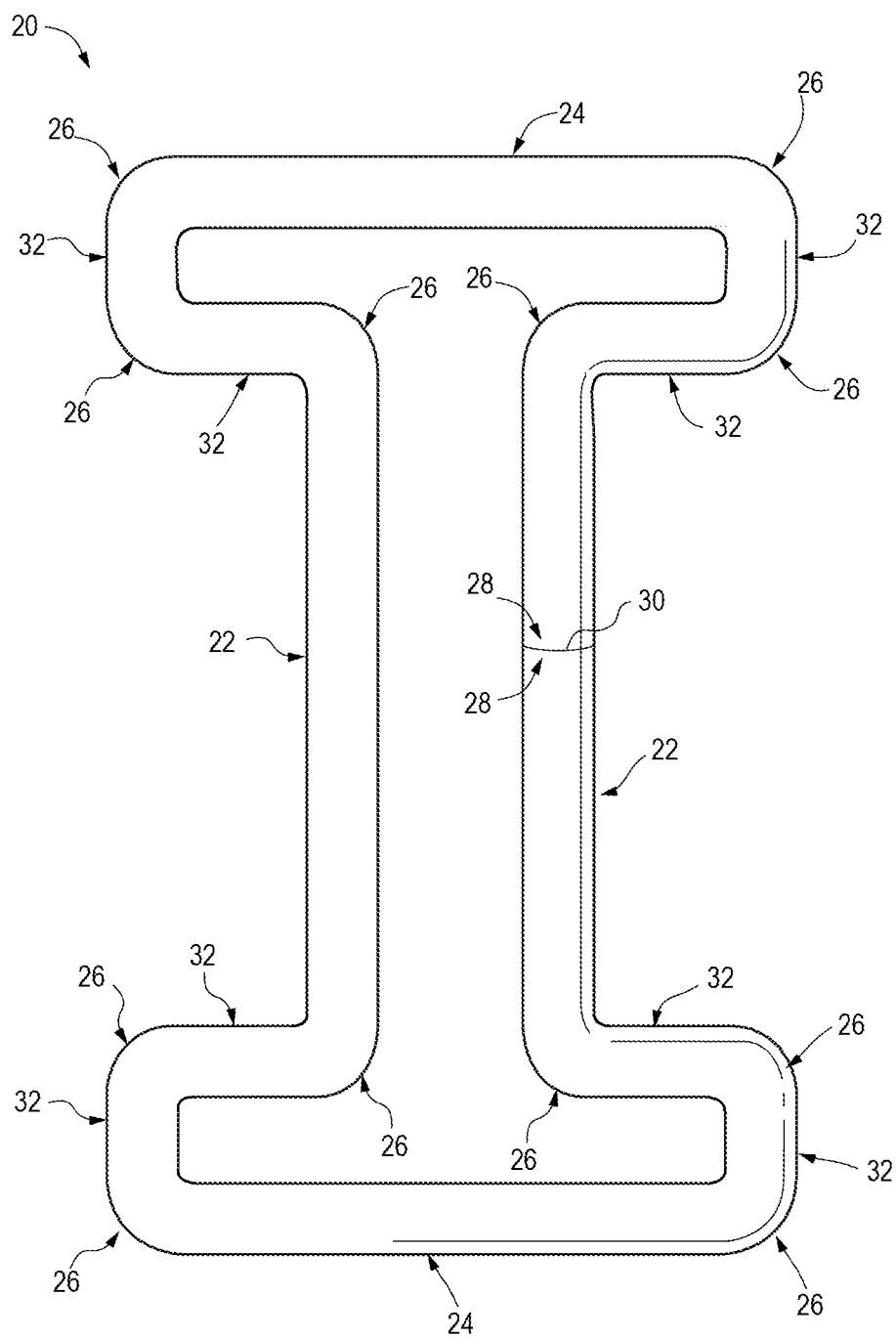
FIG. 8A is a top view of a frame of a roller device in accordance with one embodiment of the present invention.

It will be appreciated that the frame 20 may be constructed from a single piece of material or from multiple pieces of material that are affixed, fastened, or otherwise coupled together. FIG. 8A illustrates one embodiment of the frame 20 that is constructed from a single piece of material and is bent, formed, molded, or otherwise developed into a desired shape. For purposes of clarity, the rolling members 40 are not shown. The frame 20 may include first and second generally parallel and opposing support arms 24 and generally parallel longitudinally extending sections 22. As shown in FIG. 8A, the frame 20 may further include a plurality of secondary extending section 32 separated by bend sections 26 at intersecting corners (which may be of any desired radius). In this embodiment, a straight piece of round rod may be bent into shape such that it forms an enclosed generally I-shaped (or other suitable shape) loop wherein the distal ends 28 of the rod are brought together at a joint 30. While the joint 30 is shown as being located along a longitudinally extending section 22, it will be understood that the joint 30 may be positioned in other locations, such as along a support arm 24 section, along a secondary extending section 32, at a corner, along a bend section 26, or elsewhere.

FIG. 8B depicts a frame half 20c in accordance with another embodiment. In this embodiment, two of the halves 20c are affixed, fastened, or otherwise coupled together to form the full frame 20. Each frame half 20c may be generally 3-shaped or E-shaped, wherein the support arms 24 are parallel and project from a combination of any number of secondary extending sections 32 and bend sections 26 in the same relative direction and at approximate right angles relative to the longitudinally extending section 22. FIG. 8B depicts the support arms 24 as approximately equal lengths; however, it will be appreciated that the support arms 24 may vary in length and be of different lengths. The distal end 28c of support arms 24 of separate frame halves 20c can be affixed, attached, or otherwise coupled together inside the inner axial hole 44 of the rolling member 40 to maintain the overall shape of the roller device 10. These attachment or coupling means can be any number of fastening means, including by welding, interlocking elements, and the like. In another embodiment, the frame halves 20c may be held together by a strap or fastening member 60 (see FIGS. 9-13). It will be appreciated that the support arms 24 of corresponding frame halves 20c can be aligned (such that they may be received within an inner axial hole 44 of a rolling member 40), yet have a gap therebetween (see FIGS. 11 and 13).

Figure 8C:
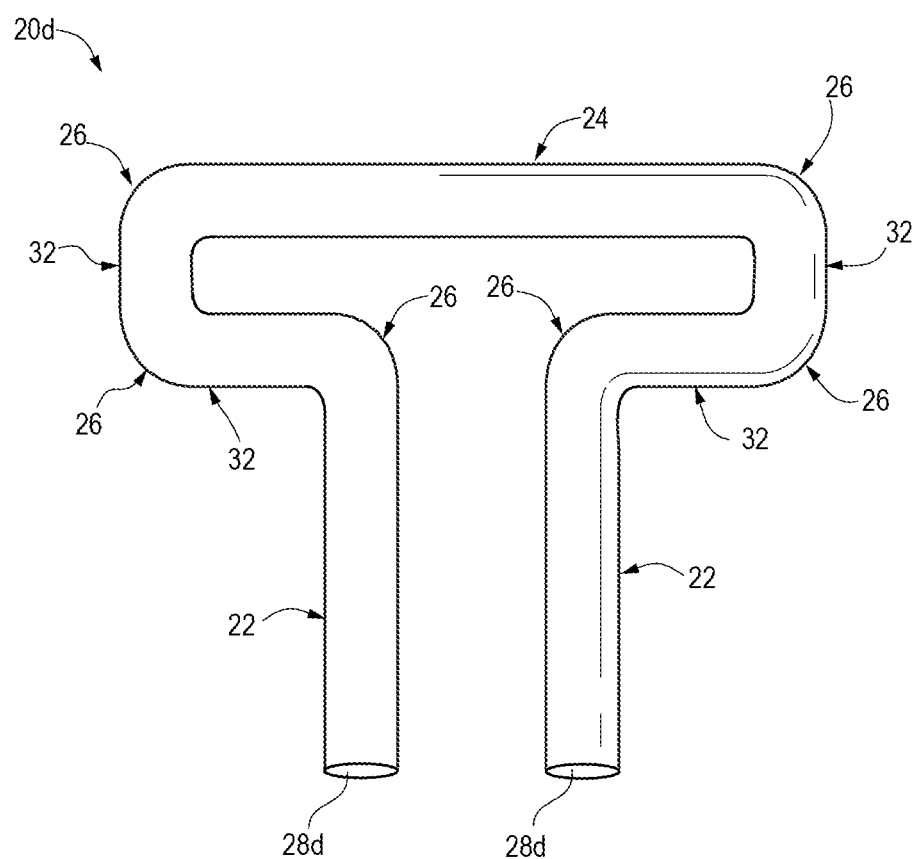
FIG. 8C is a top view of frame half of a roller device in accordance with a further embodiment of the present invention.
Figure 9:
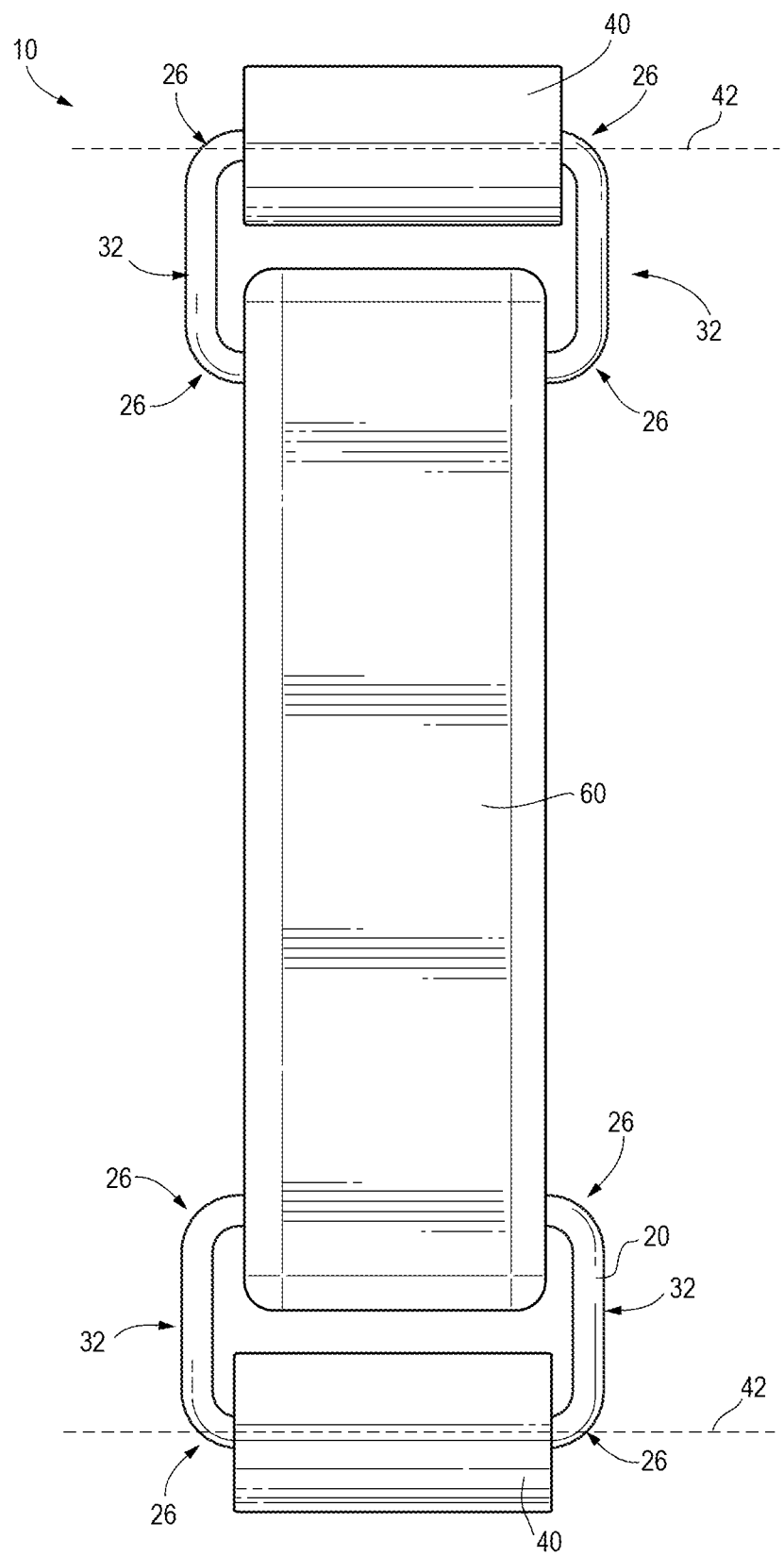
FIG. 9 is a top view of a roller device with a frame, two rolling members, and a fastening member in accordance with another embodiment of the present invention.
Figure 10:
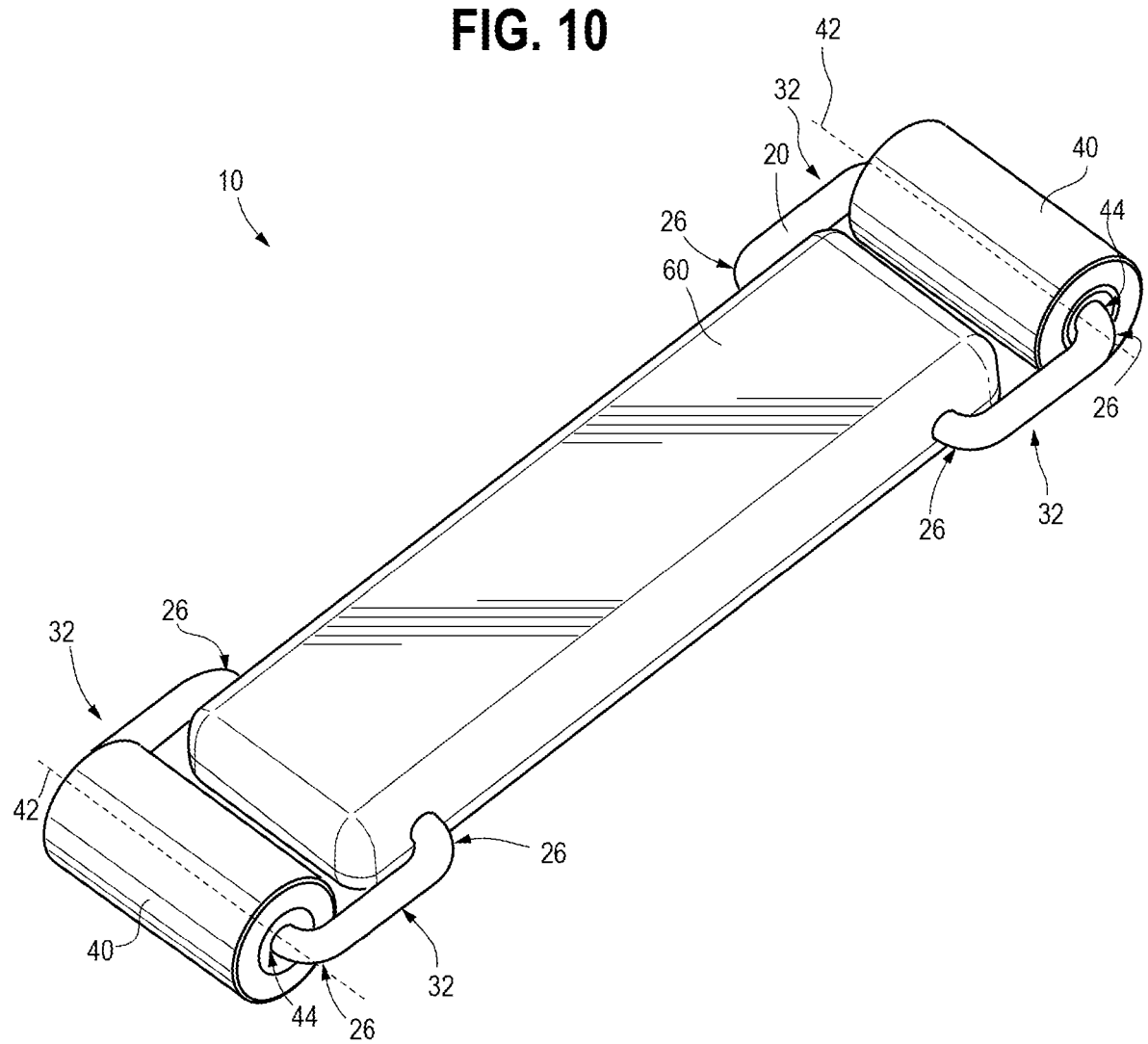
FIG. 10 is a perspective view of the roller device of FIG. 9.

FIG. 8C depicts a frame half 20d in accordance with a further embodiment. In this embodiment, two of the halves 20d are affixed, fastened, or otherwise coupled together to form the full frame 20. Each frame half 20d may be generally T-shaped, wherein the longitudinally extending sections 22 are parallel and project from a combination of any number of secondary extending sections 32 and bend sections 26 in the same relative direction and at approximate right angles relative to the support arm 24. FIG. 8C depicts the longitudinally extending sections 22 as approximately equal lengths; however, it will be appreciated that the longitudinally extending sections 22 may vary in length and be of different lengths. The distal end 28d of the longitudinally extending sections 22 of separate frame halves 20d can be affixed, attached, or otherwise coupled together to maintain the overall shape of the roller device 10. These attachment or coupling means can be any number of fastening means, including by welding, interlocking elements, and the like. In another embodiment, the frame halves 20d may be held together by a strap or fastening member 60 (see FIGS. 9-13).

Figure 11:
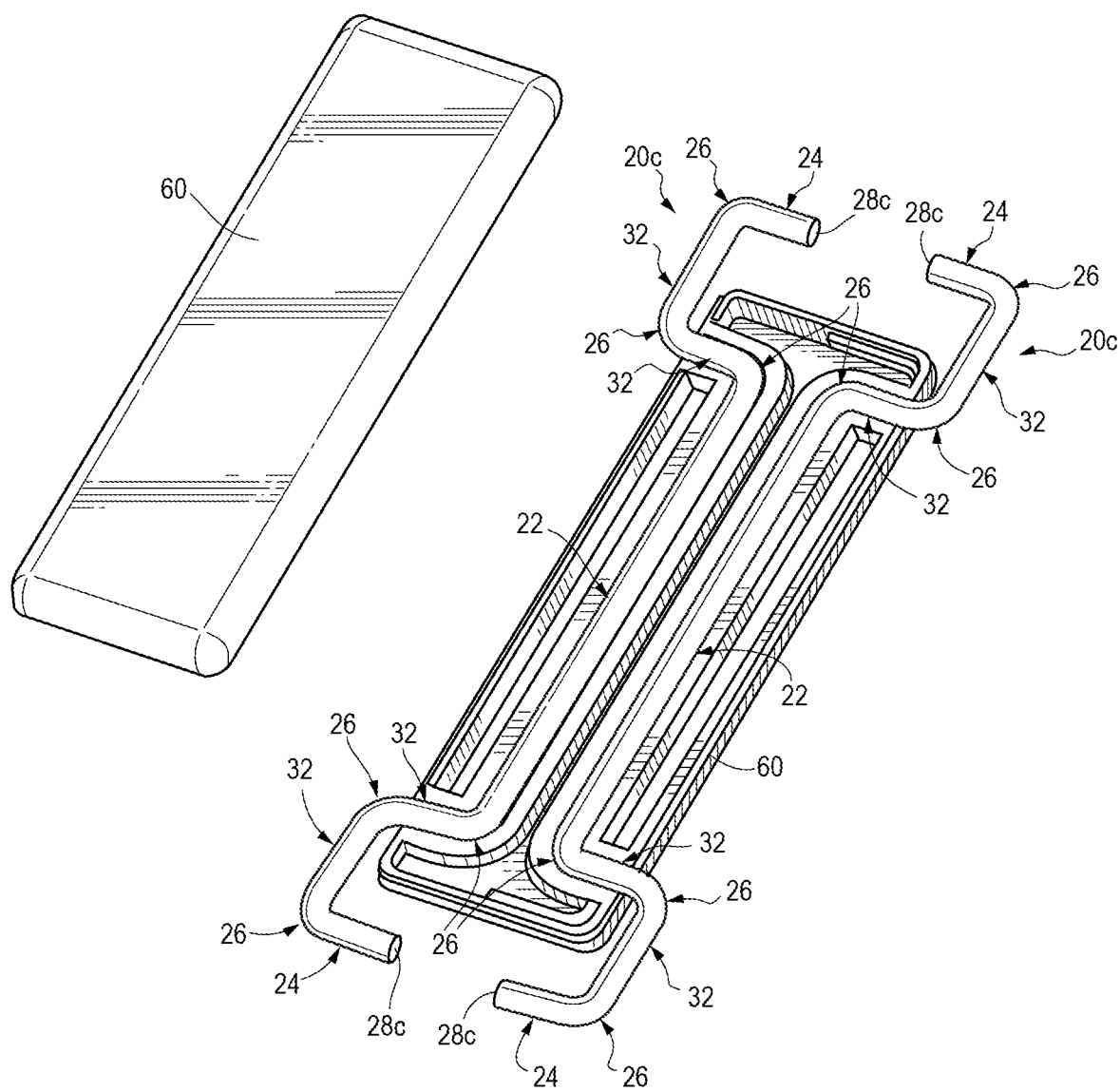
FIG. 11 is a partially exploded illustration of a roller device with a frame, two rolling members, and a fastening member in accordance with an embodiment of the present invention.
Figure 12:
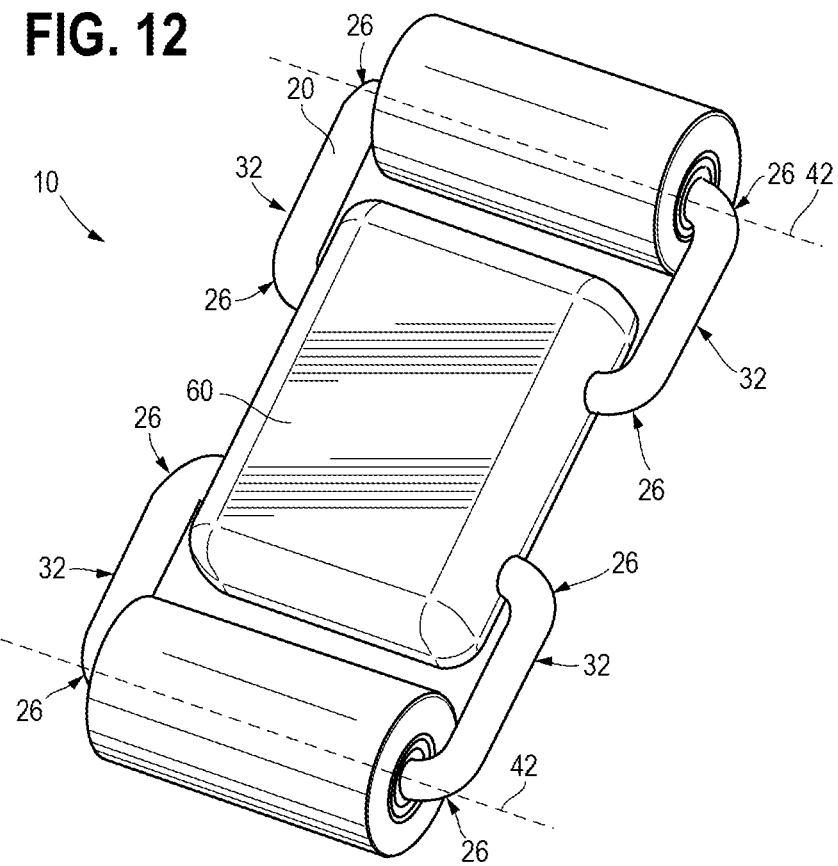
FIG. 12 a perspective view of a roller device with a frame, two rolling members, and a fastening member in accordance with another embodiment of the present invention.
Figure 13:
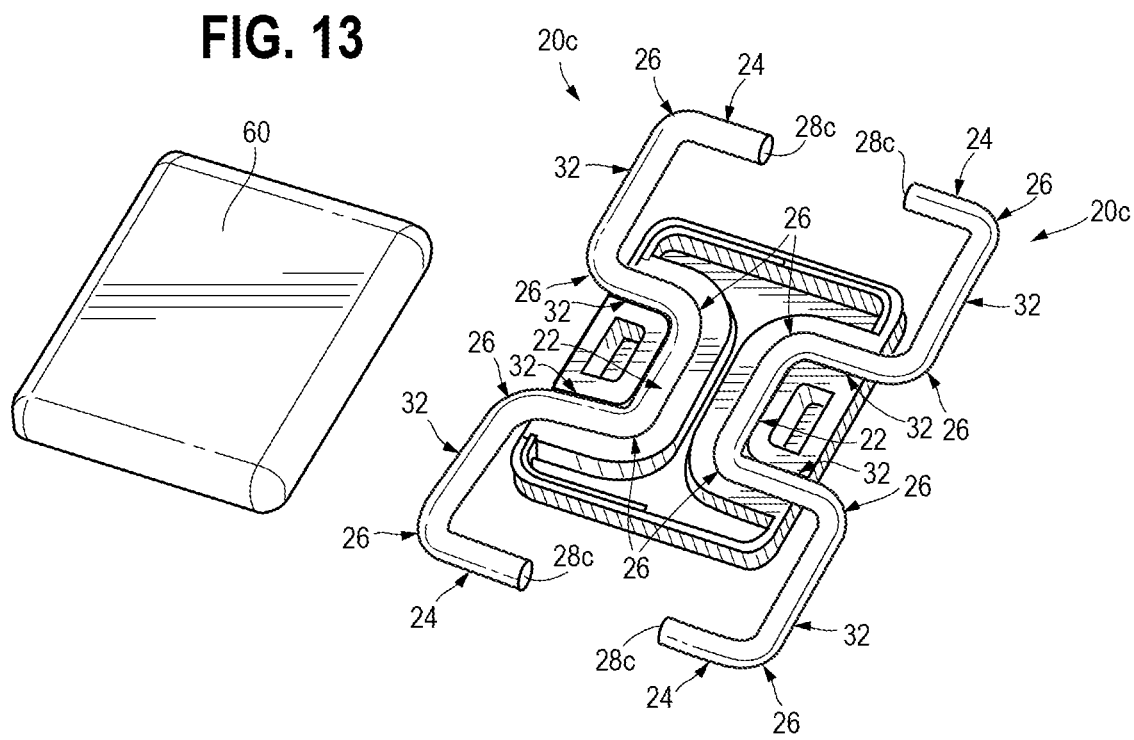
FIG. 13 is a partially exploded illustration of a roller device with a frame, two rolling members, and a fastening member in accordance with another embodiment of the present invention.

In one embodiment, as best illustrated in FIGS. 9-13, the roller device 10 may further comprise a fastening member 60. In one embodiment, the halves 20c or 20d of the frame 20 are coupled by the fastening member 60. As best illustrated in FIGS. 11 and 13, the fastening member 60 may be made of two separate pieces and may be removably attached or coupled to the frame halves 20c in a snap-fit closure system.

When halves 20c of the frame 20 are coupled by the fastening member 60, the distal ends 28c of the support arms 24 of the two frame halves 20c may align in a generally axial manner. Further, the support arms 24 of the frame halves 20c may be positioned in a spaced relation; however, it will be appreciated that, in other embodiments, the distal ends 28c of the frame halves 20c may be arranged so that they are touching or fastened together. Similarly, when halves 20d of the frame 20 are coupled by the fastening member 60, the distal ends 28d of longitudinally extending sections 22 of the two frame halves 20d may align in a generally axial manner. Further, the longitudinally extending sections 22 of the frame halves 20d may be positioned in a spaced relation; however, it will be appreciated that, in other embodiments, the distal ends 28d of the frame halves 20d may be arranged so that they are touching or fastened together. It will be appreciated that when the fastening member 60 is attached to the longitudinally extending sections 22 of the I-shaped embodiment of the roller device 10, less material is needed to create and attach the fastening member 60 than in the rectangular-shaped embodiment of the roller device 10.

Although the roller devices 10 illustrated in FIGS. 8-11 are generally depicted as elongated systems, via the elongated longitudinally extending sections 22 and the corresponding fastening members 60 thereof, it will be appreciated that the roller device 10 according to one embodiment of the present invention can also be a shortened system, as illustrated by the embodiment in FIGS. 12 and 13.

Figure 14:
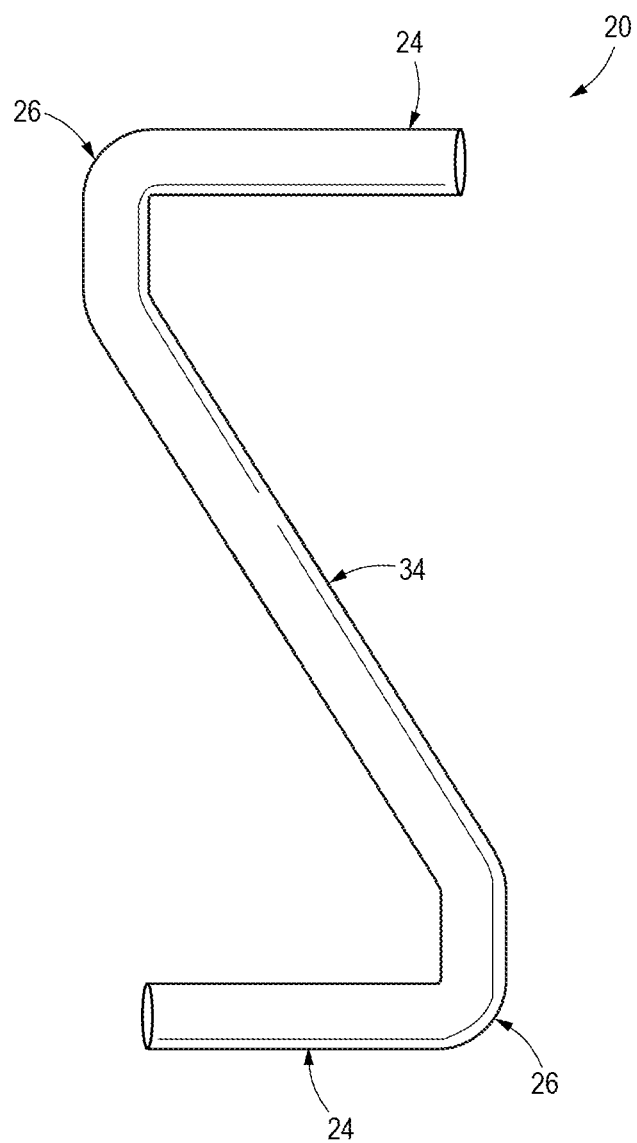
FIG. 14 is a top view of a frame of a roller device in accordance with one embodiment of the present invention.
Figure 15A:
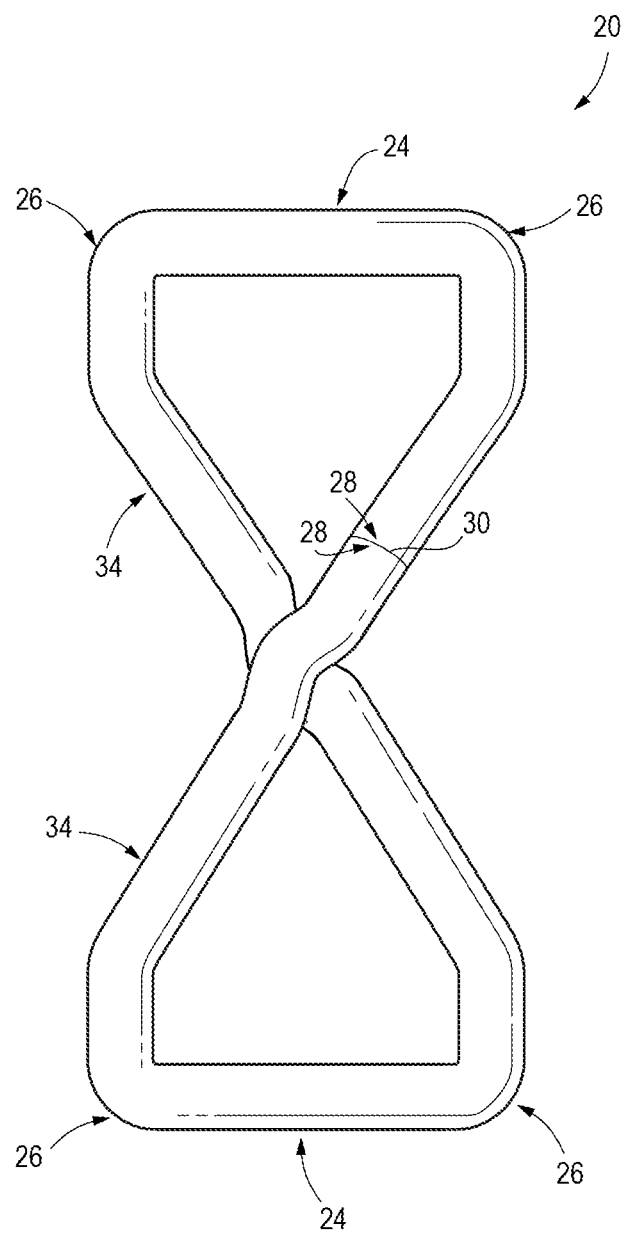
FIG. 15A is a top view of a frame of a roller device in accordance with another embodiment of the present invention.
Figure 15B:
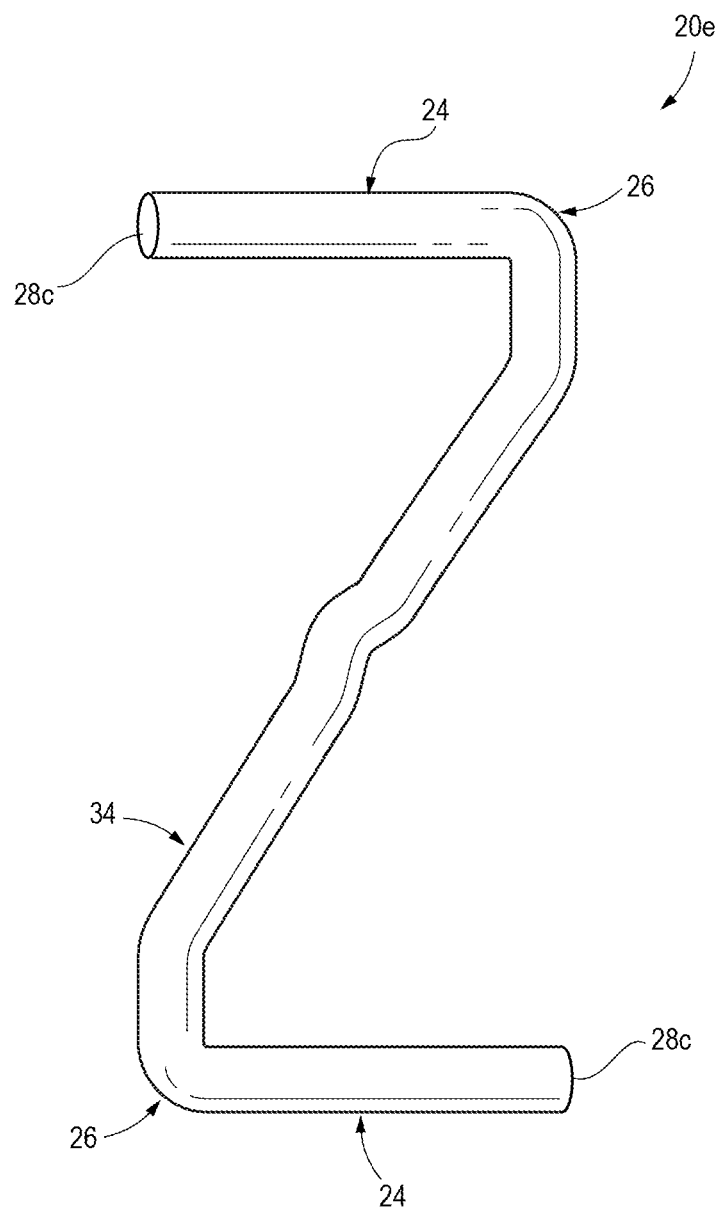
FIG. 15B is a top view of frame half of a roller device in accordance with yet another embodiment of the present invention.
Figure 16:
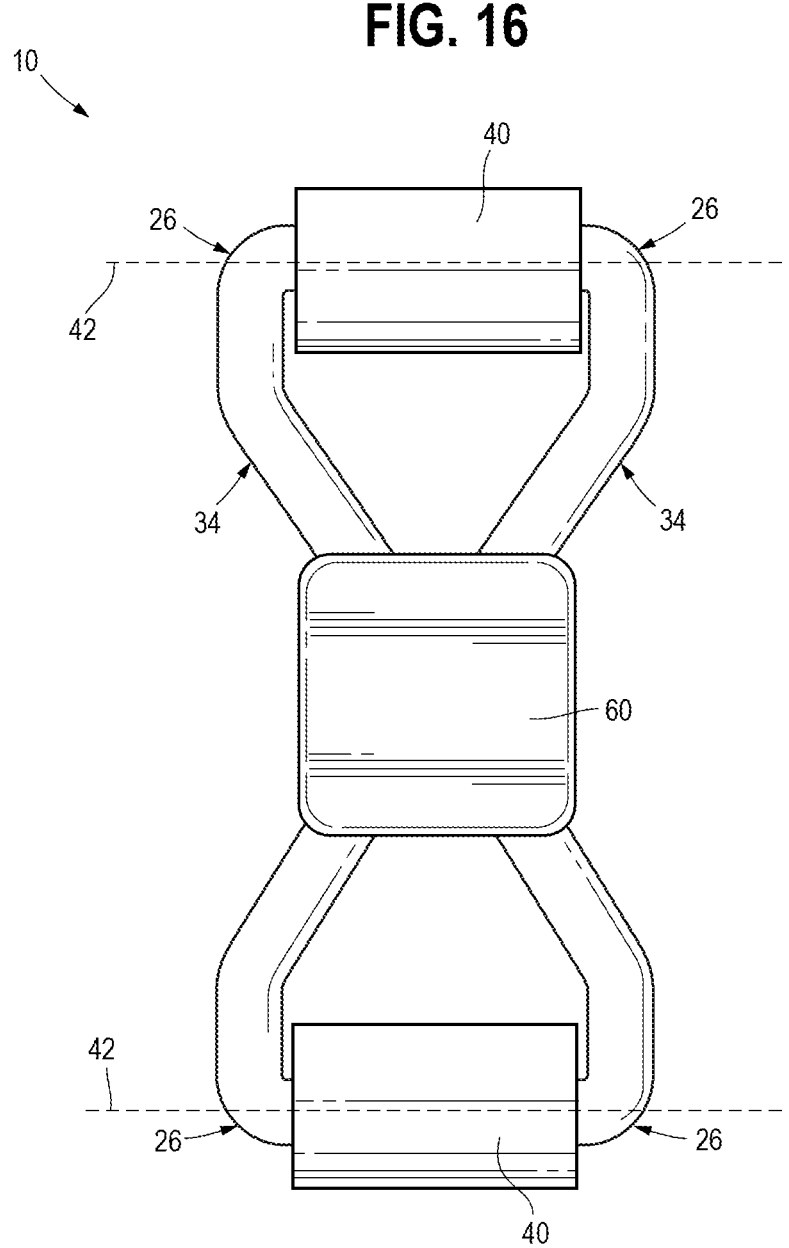
FIG. 16 is a top view of a roller device with a frame, two rolling members, and a fastening member in accordance with another embodiment of the present invention.
Figure 17:
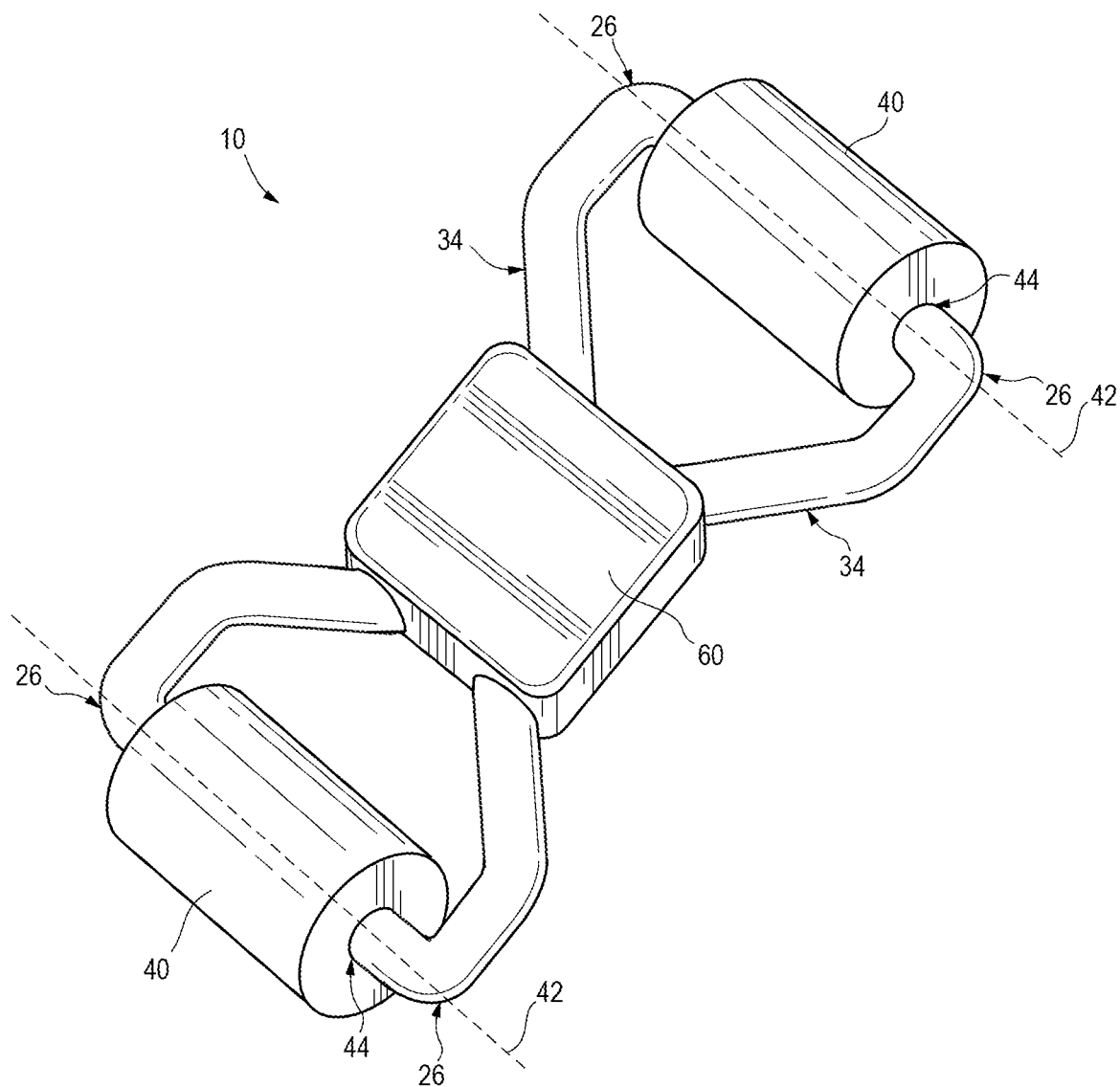
FIG. 17 is a perspective view of the roller device of FIG. 16.

In other embodiments, as best shown in FIGS. 14-17, the frame 20 may comprise at least one diagonally extending sections 34. In one embodiment, as illustrated in FIG. 14, the frame 20 may define a generally S-shaped or Z-shaped configuration. In this embodiment, the rolling members 40 (not shown) may be rotatably mounted to the support arms 24 and coupled thereto, including through the use of nuts, fixed bearings, or other suitable fastening means (not shown). In another embodiment, as illustrated in FIGS. 15-17, the frame 20 may define a generally X-shaped configuration. The frame 20 may include first and second generally parallel and opposing support arms 24, bend sections 26 (which may be of any desired radius), and at least one diagonally extending section 34. The support arms 24 may be arranged in generally parallel relation and in a general shared plane. The at least one diagonally extending section 34 may be arranged in a general shared plane, which may include the same general shared plane as the support arms 24.

The diagonally extending sections 34 may be arranged in a variety of orientations relative to each other and the other components comprising the frame 20. As best shown in FIG. 15, in one embodiment, the diagonally extending sections 34 may be arranged in a generally crossing or intersecting relation to each other. In one embodiment, the diagonally extending sections 34 cross and bisect each other at a point of intersection near or adjacent the center point of the frame 20. In such embodiment, one of the diagonally extending sections 34 may pass over the other diagonally extending section 34 at the point of intersection. In another embodiment, each of the diagonally extending sections 34 may include corresponding bends, indents, or other suitable features at the point of intersection to receive the other diagonally extending section 34 and maintain a generally low vertical profile for the frame 20. In yet another embodiment, one of the diagonally extending sections 34 may include a transverse gap, hole, eyelet, or other suitable feature at the point of intersection to pass the other diagonally extending section 34 therethrough and maintain a generally low vertical profile for the frame 20. The diagonally extending sections 34 may be affixed, fastened, or otherwise coupled together.

In one embodiment, the support arms 24 may project from the at least one diagonally extending section 34. In another embodiment, support arms 24 may project from the at least one diagonally extending section 34 at various angles and angled relations. As shown in FIG. 14, the bend section may define a right angle and the general angled relation between the support arms 24 and the at least one diagonally extending section 34 may define an acute angle. The general angled relation of the support arms 24 and the at least one diagonally extending section 34 may be between about 5 degrees and about 85 degrees in one embodiment, between about 30 degrees and about 60 degrees in another embodiment, and about 45 degrees in a further embodiment. It will be appreciated that the general angled relation of the support arms 24 and the at least one diagonally extending section 34 may define any other angle, including an obtuse angle. It will be appreciated that the support arms 24 may vary in length and be of different lengths from each other, and the at least one diagonally extending section 34 may vary in length and be of different lengths from other diagonally extending sections 34.

The support arms 24 and the at least diagonally extending section 34 may be separated by the bend sections 26 at the intersecting corners. However, it will be understood that the support arms 24 may project from the at least one diagonally extending section 34 from locations other than the ends or termini of the at least one diagonally extending section 34, or the corners of the frame 20, including, without limitation, at any point along the lengths of the at least one diagonally extending section 34. In such embodiments, the support arms 24 and the at least one diagonally extending section 34 may or may not be separated by bend sections 26.

It will be appreciated that the frame 20 may be constructed from a single piece of material or from multiple pieces of material that are affixed, fastened, or otherwise coupled together. FIG. 15A illustrates one embodiment of the frame 20 that is constructed from a single piece of material and is bent, formed, molded, or otherwise developed into a desired shape. For purposes of clarity, the rolling members 40 are not shown. The frame 20 may include first and second generally parallel and opposing support arms 24 and diagonally extending sections 34 separated by bend sections 26 at intersecting corners (which may be of any desired radius). In this embodiment, a straight piece of round rod may be bent into shape such that it forms an enclosed generally X-shaped (or other suitable shape) loop wherein the distal ends 28 of the rod are brought together at a joint 30. While the joint 30 is shown as being located along an diagonally extending section 34, it will be understood that the joint 30 may be positioned in other locations, such as along a support arm 24 section, at a corner, along a bend section 26, or elsewhere.

FIG. 15B depicts a frame half 20e in accordance with other embodiments. The frame half 20e may be generally Z-shaped or S-shaped, wherein the support arms 24 are parallel and project from a combination of bend sections 26 and the diagonally extending section 34 in the same relative direction and at angled relations relative to the diagonally extending section 34, wherein the bend sections 26 can define right angles. FIG. 15B depicts the support arms 24 as approximately equal lengths; however, it will be appreciated that the support arms 24 may vary in length and be of different lengths. In one embodiment, two of the halves 20e are affixed, fastened, or otherwise coupled together to form a full frame 20. In this embodiment, the distal end 28e of support arms 24 of separate frame halves 20e can be affixed, attached, or otherwise coupled together inside the inner axial hole 44 of the rolling member 40 to maintain the overall shape of the roller device 10. These attachment or coupling means can be any number of fastening means, including by welding, interlocking elements, and the like. In another embodiment, the frame halves 20e may be held together by a strap or fastening member 60 (see FIGS. 16 and 17). It will be appreciated that the support arms 24 of corresponding frame halves 20e can be aligned (such that they may be received within an inner axial hole 44 of a rolling member 40), yet have a gap therebetween.

FIG. 15C depicts a frame half 20f in accordance with a further embodiment. In this embodiment, two of the halves 20f are affixed, fastened, or otherwise coupled together to form the full frame 20. Each frame half 20f may be generally triangular-shaped, wherein the diagonally extending sections 34 project from a combination of any number of support arms 24 and bend sections 26 in the same relative direction and at angled relations relative to the support arm 24, wherein the bend sections 26 can define right angles. FIG. 15C depicts the diagonally extending sections 34 as approximately equal lengths; however, it will be appreciated that the diagonally extending sections 34 may vary in length and be of different lengths. The distal end 28f of the diagonally extending sections 34 of separate frame halves 20f can be affixed, attached, or otherwise coupled together to maintain the overall shape of the roller device 10. These attachment or coupling means can be any number of fastening means, including by welding, interlocking elements, and the like. In another embodiment, the frame halves 20f may be held together by a strap or fastening member 60 (see FIGS. 16 and 17).

As illustrated in FIGS. 14-15, the S-shaped configuration of the frame 20 can comprise generally squared corners, wherein each corner is defined by a combination of the support arm 24, the bend section 26, the diagonally extending section 34, and a plurality of additional extending and bended members. In such embodiments, the bend section 26 may define a right angle. When the frame 20 is to be constructed from a single piece of material that is bent, formed, molded, or otherwise developed into a desired shape, it can be advantageous to limit any bending of the single piece of materials to degrees equal to or less than 90 degrees from the initial linear shape of the single material. Further, the addition of an additional extending member at or adjacent the bend section 26 that projects from the support arm 24 toward the diagonally extending section 34 can provide clearance from the rolling members 40 from the diagonally extending sections 34 and other elements of the frame 20. The length of the additional extending member can be proportional to the dimensions of the rolling member 40, including the radius thereof. It will also be appreciated that the corners of the frames may form more or less rounded shapes, including sharp or acutely angled corners.

It will be appreciated that the at least one diagonally extending section 34 can be arranged in varying crossing and spaced relation, such that the width 12 of the roller device 10 can vary as well. The roller device 10 may be of any suitable width 12 depending upon its desired application. In one embodiment, the roller device 10 has a width 12 of such that roller device 10 may be used with a pickup bed, namely, placed in a channel or groove defined between two parallel ridges as is common in pickup truck bed floors. In that regard, the width 12 of the roller device 10 may be between about 1 inch (about 2.54 centimeters) and about 2 inches (about 5.08 centimeters) in one embodiment, and about 1.5 inches (about 3.81 centimeters) in a further embodiment, thereby allowing it to be received and roll within the channel of a pickup truck bed floor.

In one embodiment, as best illustrated in FIGS. 16 and 17, the roller device 10 may further comprise a fastening member 60. In one embodiment, the halves 20e or 20f of the frame 20 are coupled by the fastening member 60. When halves 20e of the frame 20 are coupled by the fastening member 60, the distal ends 28e of the support arms 24 of the two frame halves 20e may align in a generally axial manner. Further, the support arms 24 of the frame halves 20e may be positioned in a spaced relation; however, it will be appreciated that, in other embodiments, the distal ends 28e of the frame halves 20e may be arranged so that they are touching or fastened together. Similarly, when halves 20f of the frame 20 are coupled by the fastening member 60, the distal ends 28f of longitudinally extending sections 22 of the two frame halves 20f may align in a generally axial manner. Further, the longitudinally extending sections 22 of the frame halves 20f may be positioned in a spaced relation; however, it will be appreciated that, in other embodiments, the distal ends 28f of the frame halves 20f may be arranged so that they are touching or fastened together. It will be appreciated that when the fastening member 60 is attached to the diagonally extending sections 34 of the X-shaped embodiment of the roller device 10 at the point of intersection of the diagonally extending sections 34, less material is needed to create and attach the fastening member 60 than in the rectangular-shaped embodiment of the roller device 10 and or the I-shaped embodiment of the roller device 10.

Figure 18:
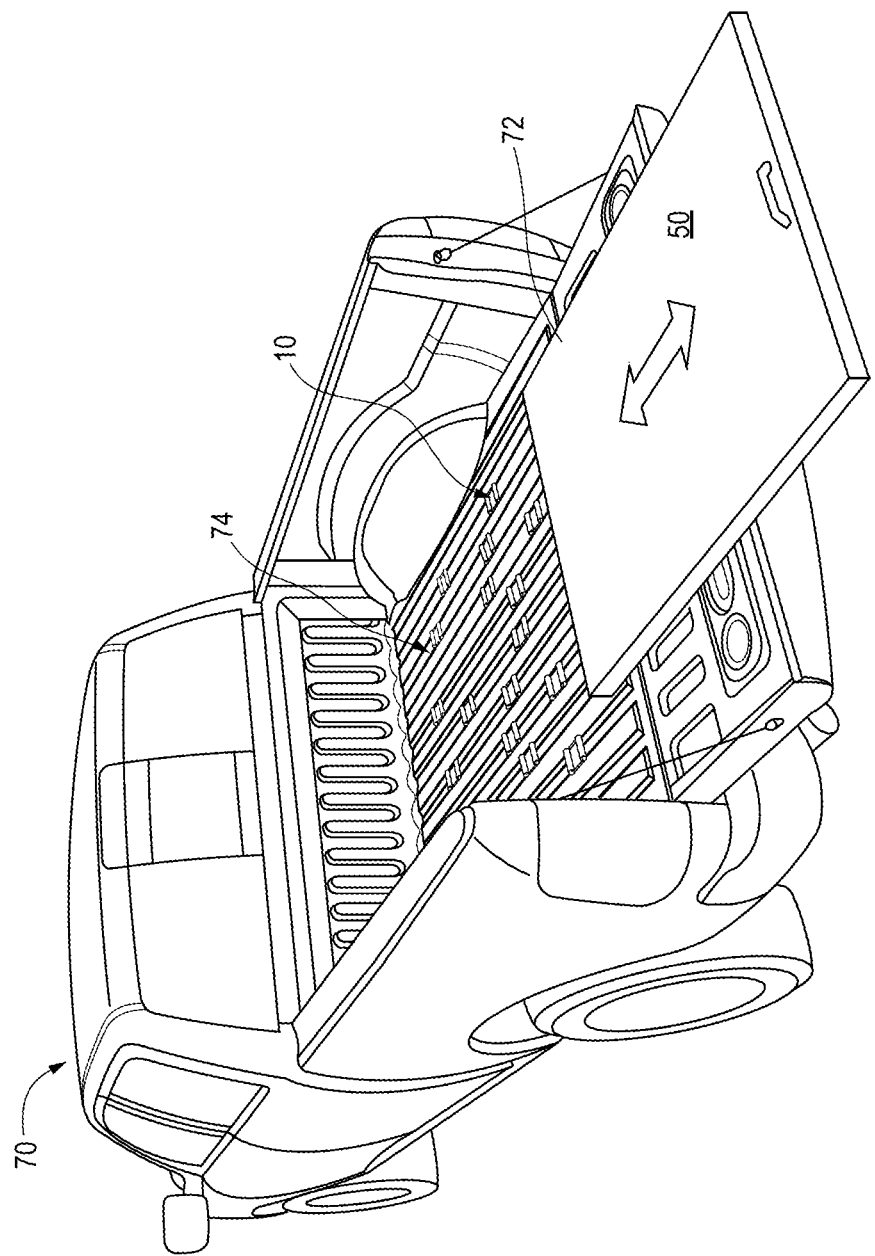
FIG. 18 is a perspective view of a plurality of roller devices used in connection with an object and the storage area of a vehicle.

FIG. 18 depicts a plurality of roller devices 10 used in connection with an object 50, such as a platform, frame, sheet of plywood, laminated board or panel, or the like, and a vehicle 70, such as a pickup truck, which may have a storage area or bed 72. In this embodiment, the plurality of roller devices 10 may be placed in the plurality of channels or grooves 74 of the bed 72. Multiple roller devices 10 may optionally be placed in the same channel or groove 74, in an inline relationship, and other roller devices 10 may be placed in separate channels or grooves 74, in an side-by-side configuration. In another embodiment, as demonstrated in FIG. 18, the plurality of roller devices 10 may be arranged in a general grid configuration, where multiple roller devices 10 may be placed in the same channel or groove 74 and other roller devices 10 may be placed in separate channels or grooves 74. The plurality of roller devices 10 may be connected or otherwise operably coupled together. Again, it will be appreciated that the roller devices 10 may be used in any desirable quantity, spacing, and configuration, including fewer in quantity than that shown in FIG. 18, for example.

As shown in FIG. 18, the object 50 may be suitable for placement in the bed 72 of the vehicle 70 onto which cargo may be placed. In one embodiment, the object 50 can be rolled in and out of the bed 72, for purposes of transport, storage, and easy access to the cargo. FIG. 18 depicts the object 50 in an extended position, but it will be appreciated that the object 50 may be placed in a retracted or stored position, such that it is entirely received within the bed 72, including for transporting purposes.

In moving the object 50, the plurality of roller devices 10 may be placed between the object 50 and the bed 72, such as under each corner of the object 50. The object 50 may contact the plurality of roller devices 10, including rolling engaging the rolling members of the plurality of roller devices 10. In such embodiment, the plurality of roller devices 10 may define a suitable vertical profile or height to fit within the plurality of channels or grooves 74 of the bed 72 and protrude slightly above the ridges between the plurality of channels or grooves 74. Some roller devices 10 may be placed ahead of the object 50 so that, as the object 50 advances into or out of the bed 72, the front end of the object 50 will advance over the top of and engage the additional roller devices 10.

From the accompanying materials, it will be seen that the invention is one well adapted to attain all the ends and objects set forth herein with other advantages which are obvious and which are inherent to the structure. It will be understood that certain features and subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described in the accompanying materials and illustrated in the drawings are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system comprising:
   a first modular roller device comprising:
      a first frame including at least one first extending section, and at least one first support arm projecting from the at least one first extending section; and
      at least two generally parallel first rolling members coupled to the first frame;
      wherein:

uppermost points of the at least two generally parallel first rolling members define a top of the first modular roller device; and lowermost points of the at least two generally parallel first rolling members define a bottom of the first modular roller device;

a second modular roller device comprising:

a second frame including at least one second extending section, and at least one second support arm projecting from the at least one second extending section; and at least two generally parallel second rolling members coupled to the second frame;

wherein:

uppermost points of the at least two generally parallel second rolling members define a top of the second modular roller device; and lowermost points of the at least two generally parallel second rolling members define a bottom of the second modular roller device;

wherein the first modular roller device and the second modular roller device are arranged in a spaced relationship; and a flat object in direct contact with the uppermost points of the first and second rolling members.

2. The system of claim 1, wherein the first modular roller device and the second modular roller device are arranged in an inline spaced relationship.

3. The system of claim 1, wherein at least one of the first modular roller device and the second modular roller device comprise a fastening member.

4. The system of claim 1, wherein the flat object comprises at least one of a board, a sheet of plywood, and a panel.

5. The system of claim 1 further comprising a truck bed, the truck bed including a floor having an upper surface with a plurality of elongated ridges defining elongated channels therebetween;

wherein the first modular roller device is received within a first channel and the second modular roller device is received within a second channel.

6. The system of claim 1 further comprising a truck bed, the truck bed including a floor having an upper surface with a plurality of elongated ridges defining elongated channels therebetween;

wherein the first and second modular roller devices are received within one of the channels.

* * * * *